(12) United States Patent
Bradbury et al.

(10) Patent No.: US 9,772,843 B2
(45) Date of Patent: *Sep. 26, 2017

(54) VECTOR FIND ELEMENT EQUAL INSTRUCTION

(71) Applicant: INTERNATIONAL BUSINESS MACHINES CORPORATION, Armonk, NY (US)

(72) Inventors: Jonathan D. Bradbury, Poughkeepsie, NY (US); Michael K. Gschwind, Chappaqua, NY (US); Eric M. Schwarz, Gardiner, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

This patent is subject to a terminal disclaimer.

(21) Appl. No.: 13/783,339

(22) Filed: Mar. 3, 2013

(65) Prior Publication Data

US 2013/0246757 A1 Sep. 19, 2013

Related U.S. Application Data

(63) Continuation of application No. 13/421,448, filed on Mar. 15, 2012.

(51) Int. Cl.
*G06F 9/30* (2006.01)
*G06F 9/455* (2006.01)

(52) U.S. Cl.
CPC ........ *G06F 9/3001* (2013.01); *G06F 9/30018* (2013.01); *G06F 9/30021* (2013.01);
(Continued)

(58) Field of Classification Search
CPC ............ G06F 9/30018; G06F 9/30185; G06F 9/30036
See application file for complete search history.

(56) References Cited

U.S. PATENT DOCUMENTS 4,852,049 A 7/1989 Sakai
5,073,864 A 12/1991 Methvin et al.
(Continued)

FOREIGN PATENT DOCUMENTS

CN 1487409 A 4/2004
CN 1573714 A 2/2005
(Continued)

OTHER PUBLICATIONS

"z/Architecture Principles of Operation," IBM® Publication No. SA22-7832-08, Ninth Edition, Aug. 2010, 1494 pages.
(Continued)

*Primary Examiner* — John Lindlof
(74) *Attorney, Agent, or Firm* — William Kinnaman; Matthew M. Hulihan; Heslin Rothenberg Farley & Mesiti PC

(57) ABSTRACT

Processing of character data is facilitated. A Find Element Equal instruction is provided that compares data of multiple vectors for equality and provides an indication of equality, if equality exists. An index associated with the equal element is stored in a target vector register. Further, the same instruction, the Find Element Equal instruction, also searches a selected vector for null elements, also referred to as zero elements. A result of the instruction is dependent on whether the null search is provided, or just the compare.

19 Claims, 16 Drawing Sheets

(52) U.S. Cl.
CPC ...... *G06F 9/30036* (2013.01); *G06F 9/30047* (2013.01); *G06F 9/30185* (2013.01); *G06F 9/4552* (2013.01)

(56) References Cited

U.S. PATENT DOCUMENTS

| | | | |
|---|---|---|---|
| 5,222,225 | A | 6/1993 | Groves |
| 5,410,661 | A | 4/1995 | Tamura |
| 5,495,592 | A | 2/1996 | James et al. |
| 5,497,468 | A | 3/1996 | Tani et al. |
| 5,551,013 | A | 8/1996 | Beausoleil et al. |
| 5,574,873 | A | 11/1996 | Davidian |
| 5,608,887 | A | 3/1997 | Dinkjian et al. |
| 5,790,825 | A | 8/1998 | Traut |
| 5,812,147 | A | 9/1998 | Van Hook et al. |
| 5,931,940 | A | 8/1999 | Shelton et al. |
| 6,009,261 | A | 12/1999 | Scalzi et al. |
| 6,094,695 | A | 7/2000 | Kornher |
| 6,185,629 | B1 | 2/2001 | Simpson et al. |
| 6,189,088 | B1 | 2/2001 | Gschwind |
| 6,192,466 | B1 | 2/2001 | Gschwind |
| 6,308,255 | B1 | 10/2001 | Gorishek, IV et al. |
| 6,334,176 | B1 | 12/2001 | Scales, III et al. |
| 6,338,057 | B1* | 1/2002 | Weeks .......................... 707/736 |
| 6,349,361 | B1 | 2/2002 | Altman et al. |
| 6,381,691 | B1 | 4/2002 | Altman et al. |
| 6,408,383 | B1 | 6/2002 | Tremblay et al. |
| 6,449,706 | B1 | 9/2002 | Chen et al. |
| 6,463,582 | B1 | 10/2002 | Lethin et al. |
| 6,499,116 | B1 | 12/2002 | Roth et al. |
| 6,513,107 | B1 | 1/2003 | Ansari |
| 6,513,109 | B1 | 1/2003 | Gschwind et al. |
| 6,570,511 | B1 | 5/2003 | Cooper |
| 6,625,724 | B1 | 9/2003 | Kahn et al. |
| 6,646,947 | B2 | 11/2003 | Fukui et al. |
| 6,662,288 | B1 | 12/2003 | Hamada et al. |
| 6,802,056 | B1 | 10/2004 | Chaiken et al. |
| 6,839,828 | B2 | 1/2005 | Gschwind et al. |
| 6,918,010 | B1 | 7/2005 | Yeager |
| 7,219,212 | B1 | 5/2007 | Sanghavi et al. |
| 7,565,510 | B2 | 7/2009 | Kunie |
| 7,689,811 | B2 | 3/2010 | Dijkstra et al. |
| 7,793,081 | B2 | 9/2010 | Gschwind et al. |
| 7,818,539 | B2 | 10/2010 | Rixner et al. |
| 7,895,419 | B2 | 2/2011 | Greiner et al. |
| 7,904,905 | B2 | 3/2011 | Cervini |
| 7,991,987 | B2 | 8/2011 | Cabot |
| 8,108,846 | B2 | 1/2012 | Gschwind |
| 8,127,121 | B2 | 2/2012 | Yates, Jr. et al. |
| 8,131,934 | B2 | 3/2012 | Greiner et al. |
| 2001/0018731 | A1 | 8/2001 | Fujii et al. |
| 2002/0026569 | A1 | 2/2002 | Liao et al. |
| 2002/0083253 | A1 | 6/2002 | Leijten et al. |
| 2003/0188130 | A1 | 10/2003 | Henry et al. |
| 2003/0188137 | A1 | 10/2003 | Morris et al. |
| 2004/0044880 | A1 | 3/2004 | Altman et al. |
| 2004/0158682 | A1 | 8/2004 | Hooker |
| 2004/0215924 | A1 | 10/2004 | Collard et al. |
| 2004/0230760 | A1 | 11/2004 | Check et al. |
| 2005/0055543 | A1 | 3/2005 | Moyer |
| 2005/0071583 | A1 | 3/2005 | Shepherd |
| 2006/0095713 | A1 | 5/2006 | Boggs et al. |
| 2006/0195680 | A1 | 8/2006 | Check et al. |
| 2006/0259746 | A1 | 11/2006 | Kunie |
| 2007/0106883 | A1 | 5/2007 | Choquette |
| 2007/0118720 | A1 | 5/2007 | Espasa et al. |
| 2007/0255933 | A1* | 11/2007 | Moyer .......................... 712/234 |
| 2008/0077733 | A1 | 3/2008 | Usui |
| 2008/0077771 | A1 | 3/2008 | Guttag et al. |
| 2008/0189519 | A1* | 8/2008 | Gschwind et al. ........... 712/213 |
| 2008/0229066 | A1 | 9/2008 | Gschwind |
| 2009/0063410 | A1 | 3/2009 | Haustein et al. |
| 2009/0182915 | A1 | 7/2009 | Farrell et al. |
| 2009/0198966 | A1 | 8/2009 | Gschwind et al. |
| 2009/0222644 | A1 | 9/2009 | Inoue et al. |
| 2009/0300331 | A1 | 12/2009 | Gschwind et al. |
| 2010/0031007 | A1 | 2/2010 | Moudgill |
| 2010/0115014 | A1 | 5/2010 | Hargil et al. |
| 2010/0274988 | A1 | 10/2010 | Mimar |
| 2010/0332803 | A1 | 12/2010 | Yoshida et al. |
| 2011/0185155 | A1 | 7/2011 | Henry et al. |
| 2011/0246751 | A1 | 10/2011 | Julier et al. |
| 2011/0314263 | A1 | 12/2011 | Greiner et al. |
| 2012/0023308 | A1 | 1/2012 | Kumura et al. |
| 2012/0166761 | A1 | 6/2012 | Hughes et al. |
| 2013/0024653 | A1* | 1/2013 | Gove .................. G06F 9/30018 712/4 |
| 2013/0243325 | A1 | 9/2013 | Bradbury et al. |
| 2013/0246699 | A1 | 9/2013 | Bradbury et al. |
| 2013/0246738 | A1 | 9/2013 | Bradbury et al. |
| 2013/0246739 | A1 | 9/2013 | Bradbury et al. |
| 2013/0246740 | A1 | 9/2013 | Bradbury et al. |
| 2013/0246751 | A1 | 9/2013 | Bradbury et al. |
| 2013/0246752 | A1 | 9/2013 | Bradbury et al. |
| 2013/0246753 | A1 | 9/2013 | Bradbury et al. |
| 2013/0246758 | A1 | 9/2013 | Bradbury et al. |
| 2013/0246759 | A1 | 9/2013 | Bradbury et al. |
| 2013/0246762 | A1 | 9/2013 | Bradbury et al. |
| 2013/0246763 | A1 | 9/2013 | Bradbury et al. |
| 2013/0246764 | A1 | 9/2013 | Bradbury et al. |
| 2013/0246766 | A1 | 9/2013 | Gschwind |
| 2013/0246767 | A1 | 9/2013 | Bradbury et al. |
| 2013/0246768 | A1 | 9/2013 | Gschwind |

FOREIGN PATENT DOCUMENTS

| | | |
|---|---|---|
| CN | 101097488 A | 1/2008 |
| CN | 101755265 A | 6/2010 |
| CN | 101911013 A | 12/2010 |
| CN | 102298515 A | 12/2011 |
| EP | 1296222 A2 | 3/2003 |
| TW | 200802083 A | 1/2008 |
| TW | 305882 | 2/2009 |
| WO | WO9429790 | 12/1994 |
| WO | 2009109626 A1 | 9/2009 |

OTHER PUBLICATIONS

"Power ISA™ Version 2.06 Revision B," International Business Machines Corporation, Jul. 23, 2010, 1342 pages.

"Intel® 64 and IA-32 Architectures Developer's Manual: vol. 2B, Instructions Set Reference, A-L," Order No. 253666-041US, Dec. 2011, 684 pages.

"Intel® 64 and IA-32 Architectures Developer's Manual: vol. 2B, Instructions Set Reference, M-Z," Order No. 253667-041US, Dec. 2011, 704 pages.

"Intel® Advanced Vector Extensions Programming Reference," Intel Corporation, Publication No. 319433-011, Jun. 2011, 595 pages.

Gschwind, Michael et al., "Dynamic and Transparent Binary Translation," Computer, Mar. 2000, pp. 54-59.

K. Ebcioglu, E.R. Altman, DAISY: Dynamic Compilation for 100% Architectural Compatibility, IBM Research Report RC20538, Yorktown Heights, NY, Aug. 1996, 84 pages.

K. Ebcioglu, E.R. Altman, E. Hokenek, A JAVA ILP Machine Based on Fast Dynamic Compilation, IEEE MASCOTS International Workshop on Security and Efficiency Aspects of Java, Eilat, Israel, Jan. 1997, pp. 1-13.

K. Ebcioglu, E.R. Altman, DAISY: Dynamic Compilation for 100% Architectural Compatibility, 24th Annual International Symposium on Computer Architecture_Denver, Colorado, Jun. 1997, pp. 26-37.

M. Gschwind, Method and apparatus for determining branch addresses in programs generated by binary translation, IBM Invention Disclosure YOR8-1998-0334, Yorktown Heights, NY, Jul. 1998. (Research Disclosures, No. 416, Dec. 1998.), pp. 1-9.

M. Gschwind, Method and apparatus for rapid return address determination in binary translation, IBM Invention Disclosure YOR8-1998-0410, Yorktown Heights, NY, Sep. 1998, pp. 1-2.

K. Ebcioglu, J. Fritts, S. Kosonocky, M. Gschwind, E. Altman, K. Kailas, A. Bright, An Eight-Issue Tree VLIW Processor for

(56) References Cited

OTHER PUBLICATIONS

Dynamic Binary Translation, International Conference on Computer Design (ICCD '98), Dallas, TX, Oct. 1998, pp. 2-8.
M. Gschwind, Method for the deferred materialization of condition code information, IBM Invention Disclosure YOR8-1999-0001, Yorktown Heights, NY, Jan. 1999, (Research Disclosures, No. 431, Mar. 2000.), pp. 1-3.
M. Gschwind, Method for achieving high hit rate for an address translation cache in binary translation, IBM Invention Disclosure YOR8-1999-0194, Yorktown Heights, NY, Mar. 1999. (Research Disclosures, No. 431, Mar. 2000.), pp. 1-2.
M. Gschwind, Method for implementing precise exceptions, IBM Invention Disclosure YOR8-1999-0197, Yorktown Heights, NY, Mar. 1999. (Research Disclosures, No. 431, Mar. 2000.), pp. 1-3.
A. Bright, J. Fritts, M. Gschwind, A Decoupled Fetch-Execute Engine with Static Branch Prediction Support, IBM Research Report RC23261, Yorktown Heights, NY, Mar. 1999, pp. 1-21.
M. Gschwind, K. Ebcioglu, E. Altman, S. Sathaye, DAISY/390: Full System Binary Translation of IBM System/390, IBM Research Report RC 22027, Yorktown Heights, NY, Jun. 1999, pp. 1-47.
K. Ebcioglu, E. Altman, S. Sathaye, M. Gschwind, Execution-Based Scheduling for VLIW Architectures, Europar '99 (P. Amestoy, P. Berger, M. Dayde, I. Duff, V. Fraysse, L. Giraud, D. Ruiz, eds.), pp. 1269-1280, Lecture Notes in Computer Science 1685, Springer-Verlag 1999, pp. 1-10.
B.S. Yang, S.M. Moon, S. Park, J. Lee, S. Lee, J. Park, Y. C. Chung, S. Kim, K. Ebcioglu, E. Altman, LaTTe: A Java VM Just-in-Time Compiler with Fast and Efficient Register Allocation, International Conference on Parallel Architectures and Compilation Techniques (PACT '99), pp. 128-138, IEEE Computer Society Press, Oct. 1999, pp. 1-11.
K. Ebcioglu, E.R. Altman, S. Sathaye, and M. Gschwind, Optimizations and Oracle Parallelism with Dynamic Translation, 32nd Annual International Symposium on Microarchitecture, Haifa, Israel, Nov. 1999, pp. 1-12.
E. Altman, M. Gschwind, S. Sathaye, S. Kosonocky, A. Bright, J. Fritts, P. Ledak, D. Appenzeller, C. Agricola, Z. Filan, BOA: The Architecture of a Binary Translation Processor, IBM Research Report RC 21665, Yorktown Heights, NY, Dec. 1999, pp. 1-35.
E. Altman, K. Ebcioglu, M. Gschwind, S. Sathaye, Efficient Instruction scheduling with precise exceptions, IBM Research Report RC22957, Yorktown Heights, NY, Dec. 1999, pp. 1-33.
M. Gschwind, Method and apparatus for the selective scoreboarding of computation results, IBM Invention Disclosure YOR8-2000-0004, Yorktown Heights, NY, Jan. 2000. (IBM Technical Disclosure Bulletin Jan. 2001.), pp. 1-2.
E.R. Altman, D. Kaeli, Y. Sheffer, Welcome to the Opportunities of Binary Translation, IEEE Computer, vol. 33, Issue 3, pp. 40-45, Mar. 2000.
M. Gschwind, E.R. Altman, S. Sathaye, P. Ledak, D. Appenzeller, Dynamic and Transparent Binary Translation, IEEE Computer, vol. 33, Issue 3, pp. 54-59, Mar. 2000.
E.R. Altman, K. Ebcioglu, Full System Binary Translation: RISC to VLIW, IBM Research Report RC23262, Yorktown Heights, NY, Mar. 2000, pp. 1-22.
E.R. Altman, K. Ebcioglu, Simulation and Debugging of Full System Binary Translation, IBM Research Report RC23283, Yorktown Heights, NY, Mar. 2000, pp. 1-16.
M. Gschwind, K. Ebcioglu, E. Altman, and S. Sathaye, Binary Translation and Architecture Convergence Issues for IBM S/390, International Conference on Supercomputing 2000, May 2000, Santa Fe, New Mexico, pp. 336-347, ACM Press.
S.I. Lee, B.S. Yang, S. Kim, S. Park, S.M. Moon, K. Ebcioglu, and E. Altman, Efficient Java Exception Handling in Just-in-Time Compilation, ACM 2000 Java Grande Conference, San Francisco, California, Jun. 2000, pp. 1-8.
K. Ebcioglu, E.R. Altman, M. Gschwind, S. Sathaye, Dynamic Binary Translation and Optimization, IBM Research Report RC22025, Yorktown Heights, NY, Jul. 2000, pp. 1-62.
E.R. Altman, K. Ebcioglu, Simulation and Debugging of Full System Binary Translation, Proceedings of the International Society for Computers and Their Applications 13th International Conference (G. Chaudhry and E. Sha, eds.), Las Vegas, Nevada, USA, Aug. 2000, pp. 446-453. (ISBN 1-880843-34-X.).
M. Gschwind, E. Altman, On Achieving Precise Exceptions Semantics in Dynamic Optimization, IBM Research Report RC21900, Yorktown Heights, NY, Dec. 2000, pp. 1-13.
Michael Gschwind, Stephen Kosonocky, Erik Altman, High Frequency Pipeline Architecture Using the Recirculation Buffer, IBM Research Report RC 23113, Yorktown Heights, NY, Mar. 2001, pp. 1-25.
K. Ebcioglu, E.R. Altman, M. Gschwind, S. Sathaye, Dynamic Binary Translation and Optimization, IEEE Transactions on Computers, vol. 50, Issue 6, pp. 529-548, Jun. 2001.
E.R. Altman, K. Ebcioglu, M. Gschwind, S. Sathaye, Advances and Future Challenges in Binary Translation and Optimization, Proceedings of the IEEE, Special Issue on Microprocessor Architecture and Compiler Technology, pp. 1710-1722, Nov. 2001.
M. Gschwind, E.R. Altman, Precise Exception Semantics in Dynamic Optimization 2002 Symposium on Compiler Construction (CC 2002), Grenoble, France, Apr. 2002, pp. 1-15.
M. Gschwind, E.R. Altman, Inherently Lower Complexity Architectures using Dynamic Optimization, IBM Research Report RC22442, Yorktown Heights, NY, May 2002, pp. 1-15.
M. Gschwind, E.R. Altman, Inherently Lower Complexity Architectures using Dynamic Optimization, Workshop on Complexity-Effective Design in conjunction with the 29th Annual International Symposium on Computer Architecture (ISCA 2002), Anchorage, AK, May 2002, pp. 1-14.
E.R. Altman, M. Gschwind, BOA: A Second Generation DAISY Architecture, Tutorial, 31st Annual International Symposium on Computer Architecture (ISCA 2004), Munich, Germany, Jun. 2004, pp. 1-100.
M. Gschwind, E.R. Altman, Dynamic Compilation at the System Level, Tutorial, 4th Annual International Symposium on Code Generation and Optimization (CGO 2006), New York City, NY, Mar. 2006, 212 pages.
S. Sathaye et al., "BOA: Targeting Multi-Gigahertz with Binary Translation," Proc. of the 1999 Workshop on Binary Translation, IEEE Computer Society Technical Committee on Computer Architecture Newsletter, 1999, pp. 1-12.
E. Altman, Kemal Ebcioglu, "Simulation and Debugging of Full System Binary Translation," IBM T.J. Watson Research Center, 2000 (no further date information available), pp. 1-15.
G. Silberman et al., "An Architectural Framework for Migration from CISC to Higher Performance Platforms," ICS '92 Proceedings of the 6$^{th}$ International Conference on Supercomputing, 1992, pp. 198-215.
G. Silberman et al., "An Architectural Framework for Supporting Heterogeneous Instruction-Set Architectures," Computer, vol. 26, Issue 6, Jun. 1993, pp. 39-56.
Leiner, K., "Move Character Instruction and Procedure to Avoid Crossing Page Boundary and Fast Circuit for Checking Address Range," IBM Technical Disclosure Bulletin, IPCOM000049778D, Jul. 1982, p. 744.
Anonymous, "Method for Handling Page Boundary Crossings Encountered by a Hardware Accelerator," IBM Technical Disclosure Bulletin, IPCOM000200051D, Sep. 2010, pp. 1-6.
International Search Report and Written Opinion for PCT/IB2012/056438 dated Mar. 22, 2013, pp. 1-11.
International Search Report and Written Opinion for PCT/IB2012/56434 dated Mar. 26, 2013, pp. 1-9.
International Search Report and Written Opinion for PCT/IB2012/056436 dated Apr. 16, 2013, pp. 1-12.
International Search Report and Written Opinion for PCT/IB2013/054614 dated Jul. 2, 2013, pp. 1-9.
International Search Report and Written Opinion for PCT/IB2013/054608 dated Jul. 15, 2013, pp. 1-8.
International Search Report and Written Opinion for PCT/IB2013/51647 dated Jul. 11, 2013, pp. 1-9.
International Search Report and Written Opinion for PCT/IB2013/51810 dated Jul. 25, 2013, pp. 1-6.

(56) References Cited

OTHER PUBLICATIONS

International Search Report and Written Opinion for PCT/IB2013/51811 dated Jul. 25, 2013, pp. 1-6.
International Search Report and Written Opinion for PCT/IB2013/051648 dated Aug. 1, 2013, pp. 1-7.
International Search Report and Written Opinion for PCT/IB2013/051649 dated Aug. 1, 2013, pp. 1-8.
Office Action for U.S. Appl. No. 13/421,640 dated Apr. 23, 2014, pp. 1-30.
Final Office Action for U.S. Appl. No. 13/421,640 dated Sep. 8, 2014, pp. 1-26.
Office Action for U.S. Appl. No. 13/421,498 dated Sep. 10, 2014, pp. 1-32.
Extended European Search Report for PCT/IB2013051810 dated Aug. 1, 2014, pp. 1-10.
Extended European Search Report for PCT/IB2013051811 dated Sep. 8, 2014, pp. 1-9.
Extended European Search Report for PCT/IB2012056436 dated Oct. 16, 2014, pp. 1-9.
Extended European Search Report for PCT/IB2012056438 dated Nov. 10, 2014, pp. 1-6.
Extended European Search Report for PCT/IB2012056434 dated Dec. 16, 2014, pp. 1-6.
Office Action for U.S. Appl. No. 13/421,640 dated Dec. 19, 2014, pp. 1-31.
Gorton, Rick, "Faster String Operations", Apr. 2, 2009, pp. 1-8.
Kankowski, Peter, "Implementing strcmp, strlen, and strstr Using SSE 4.2 Instructions," Nov. 2014, pp. 1-21.
Mc Guire, Tim, "The String Instructions," Nov. 2014, pp. 1-6.
Oehler, R.R. et al., "IBM RISC System/6000 Processor Architecture," IBM J. Res. Develop., vol. 34, No. 1, Jan. 1990, pp. 23-36.
"strcpy.s", Apple Computer, Inc., pp. 1-4, Nov. 2014.
"C Programming/Strings," (http://en.wildbooks.org/wild/C_Programming/Strings), Nov. 2014, pp. 1-12.
"C string handling," (http://en.wikibooks.org/wiki/C_string_handling), Mar. 2015, pp. 1-6.
Office Action for U.S. Appl. No. 13/421,614 dated Feb. 19, 2015, pp. 1-17.
Office Action for U.S. Appl. No. 13/421,498 dated Mar. 12, 2015, pp. 1-31.
Office Action for U.S. Appl. No. 13/421,657 dated Mar. 25, 2015, pp. 1-21.
Office Action for U.S. Appl. No. 13/421,442 dated Apr. 2, 2015, pp. 1-23.
Office Action for U.S. Appl. No. 13/783,789 dated Apr. 2, 2015, pp. 1-21.
Office Action for U.S. Appl. No. 13/421,448 dated Apr. 2, 2015, pp. 1-22.
Office Action for U.S. Appl. No. 13/421,451 dated Apr. 7, 2015, pp. 1-21.
Office Action for U.S. Appl. No. 13/421,560 dated Apr. 7, 2015, pp. 1-22.
"Emulator" Wikipedia, http://en.wikipedia.org/w/index.php?title_Emulator&oldid-475864955, downloaded Apr. 14, 2015, pp. 1-10.
Office Action for U.S. Appl. No. 13/783,348 dated May 6, 2015, pp. 1-21.
Office Action for U.S. Appl. No. 13/783,335 dated May 26, 2014, pp. 1-18.
Final Office Action for U.S. Appl. No. 13/421,640 dated Jun. 2, 2015, pp. 1-30.
Notice of Allowance for U.S. Appl. No. 13/421,614 dated Jun. 3, 2015, pp. 1-9.
Office Action for U.S. Appl. No. 13/421,599, dated Jun. 25, 2015, pp. 1-12.
Office Action for U.S. Appl. No. 13/783,332, dated Jun. 25, 2015, pp. 1-11.
Examination Report in Application No. 12871580.2, dated Jul. 6, 2015, pp. 1-7.
Office Action in U.S. Appl. No. 13/783,321, dated Jul. 7, 2015, pp. 1-19.
Office Action in U.S. Appl. No. 13/421,456, dated Aug. 6, 2015, pp. 1-21.
Office Action in U.S. Appl. No. 13/783,337, dated Aug. 7, 2015, pp. 1-19.
Final Office Action in U.S. Appl. No. 13/783,789, dated Aug. 20, 2015, pp. 1-20.
Final Office Action in U.S. Appl. No. 13/421,448, dated Aug. 20, 2015, pp. 1-20.
Final Office Action in U.S. Appl. No. 13/783,348, dated Aug. 21, 2015, pp. 1-20.
Final Office Action in U.S. Appl. No. 13/421,560, dated Aug. 25, 2015, pp. 1-20.
Final Office Action in U.S. Appl. No. 13/421,442, dated Aug. 28, 2015, pp. 1-21.
Final Office Action in U.S. Appl. No. 13/783,332, dated Dec. 1, 2015, pp. 1-15.
Final Office Action in U.S. Appl. No. 13/421,599, dated Dec. 4, 2015, pp. 1-18.
Office Action in U.S. Appl. No. 13/421,560, dated Dec. 22, 2015, pp. 1-19.
Office Action in U.S. Appl. No. 13/783,348, dated Dec. 22, 2015, pp. 1-19.
Notice of Allowance in U.S. Appl. No. 13/421,456, dated Dec. 22, 2015, pp. 1-11.
Notice of Allowance in U.S. Appl. No. 13/783,337, dated Jan. 5, 2016, pp. 1-11.
Office Action in U.S. Appl. No. 13/421,448, dated Jan. 7, 2016, pp. 1-19.
Office Action in U.S. Appl. No. 13/421,442, dated Jan. 8, 2016, pp. 1-20.
Office Action in U.S. Appl. No. 13/783,789, dated Jan. 8, 2016, pp. 1-19.
Final Office Action in U.S. Appl. No. 13/783,321, dated Jan. 13, 2016, pp. 1-9.
Office Action in U.S. Appl. No. 13/421,451, dated Jan. 27, 2016, pp. 1-26.
Office Action in U.S. Appl. No. 14/560,001, dated Jan. 29, 2016, pp. 1-15.
Corrected Notice of Allowability in U.S. Appl. No. 13/421,640, dated Feb. 17, 2016, pp. 1-10.
Notice of Allowance in U.S. Appl. No. 13/421,599, dated Mar. 4, 2016, pp. 1-12.
Notice of Allowance in U.S. Appl. No. 13/783,332, dated Mar. 11, 2016, pp. 1-11.
Office Action in U.S. Appl. No. 13/783,335, dated Mar. 14, 2016, pp. 1-16.
Final Office Action in U.S. Appl. No. 13/421,442, dated May 26, 2016, pp. 1-23.
Final Office Action in U.S. Appl. No. 13/783,789, dated May 26, 2016, pp. 1-24.
Final Office Action in U.S. Appl. No. 13/421,448, dated May 31, 2016, pp. 1-24.
Final Office Action in U.S. Appl. No. 13/421,451, dated Jun. 13, 2016, pp. 1-25.
Final Office Action in U.S. Appl. No. 13/783,335, dated Sep. 20, 2016, pp. 1-33.
Notice of Allowance in U.S. Appl. No. 13/421,442, dated Sep. 19, 2016, pp. 1-28.
Notice of Allowance in U.S. Appl. No. 13/783,789, dated Sep. 19, 2016, pp. 1-21.
Notice of Allowance in U.S. Appl. No. 13/421,448, dated Sep. 21, 2016, pp. 1-16.
Office Action in U.S. Appl. No. 15/163,161, dated Mar. 30, 2017, pp. 1-23.
Office Action in U.S. Appl. No. 15/163,348, dated Mar. 30, 2017, pp. 1-23.
Office Action in U.S. Appl. No. 14/995,358, dated Apr. 19, 2017, pp. 1-25.
Office Action in U.S. Appl. No. 14/995,337, dated Apr. 19, 2017, pp. 1-26.
Extended European Search Report for PCT/IB2013051647 dated Apr. 28, 2017, pp. 1-8.

(56) References Cited

OTHER PUBLICATIONS

Communication Pursuant to Article 94(3) EPC for Application No. 12 871 072.0-1879 dated Jul. 24, 2017, pp. 1-7.
European Examination Report for Application No. 12 871 181.9-1879 dated Jul. 31, 2017, pp. 1-7.
Final Office Action in U.S. Appl. No. 14/955,337 dated Aug. 18, 2017, 26 pgs.
Final Office Action in U.S. Appl. No. 14/995,358 dated Aug. 18, 2017, 26 pgs.
Final Office Action in U.S. Appl. No. 15/163,161 dated Aug. 18, 2017, 25 pgs.
Final Office Action in U.S. Appl. No. 15/163,348 dated Aug. 18, 2017, 25 pgs.

* cited by examiner

VECTOR FIND ELEMENT EQUAL

| OPCODE | V₁ | V₂ | V₃ | /// | M₅ | /// | M₄ | RXB | OPCODE |
|---|---|---|---|---|---|---|---|---|---|
| 0 | 8 | 12 | 16 | 20 | 24 28 | 32 | 36 | 40 | 47 |
| 302a | 304 | 306 | 308 | | 310 | | 312 | 314 | 302b |

VECTOR FIND ELEMENT EQUAL INSTRUCTION

This application is a continuation of co-pending U.S. Ser. No. 13/421,448, entitled "VECTOR FIND ELEMENT EQUAL INSTRUCTION," filed Mar. 15, 2012, which is hereby incorporated herein by reference in its entirety.

BACKGROUND

An aspect of the invention relates, in general, to text processing, and in particular, to facilitating processing associated with character data.

Text processing often requires the comparing of character data, including, but not limited to, the comparing of character data strings. Typically, instructions used to compare character data compare a single byte of data at a time.

Further, text processing often requires other types of string processing, including finding the termination point (e.g., end of a string), determining the length of the character data, finding a particular character, etc. Current instructions to perform these types of processing tend to be inefficient.

BRIEF SUMMARY

The shortcomings of the prior art are overcome and advantages are provided through the provision of a method of executing a machine instruction. The method includes, for instance, obtaining, by a processor, a machine instruction for execution, the machine instruction being defined for computer execution according to a computer architecture, the machine instruction including, for instance, at least one opcode field to provide an opcode, the opcode identifying a Vector Find Element Equal operation; an extension field to be used in designating one or more registers; a first register field combined with a first portion of the extension field to designate a first register, the first register including a first operand; a second register field combined with a second portion of the extension field to designate a second register, the second register including a second operand; a third register field combined with a third portion of the extension field to designate a third register, the third register including a third operand; a mask field, the mask field including one or more controls to be used during execution of the machine instruction; and executing the machine instruction, the execution including determining whether the mask field includes a zero element control set to indicate a search for a zero element; based on the mask field including the zero element control set to indicate the search for a zero element, searching the second operand for a zero element, the searching providing a null index, the null index including one of an index of a zero element found in the search or an indication of no zero elements found; comparing one or more elements of the second operand with one or more elements of the third operand for equality, the comparing providing a compare index, the compare index including one of an index of an equal element based on the comparing finding an equal element or an indication of no equality based on the comparing finding no equal elements; providing a result, the result based on whether the search for zero element was performed, wherein the result includes one of: based on not performing the search for zero element, the result includes the compare index; or based on performing the search for zero element, the result includes one of the compare index or the null index.

Computer program products and systems relating to one or more aspects of the present invention are also described and may be claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3 depicts one embodiment of a format of a Vector Find Element Equal instruction, in accordance with an aspect of the present invention;

DETAILED DESCRIPTION

Figure 1:
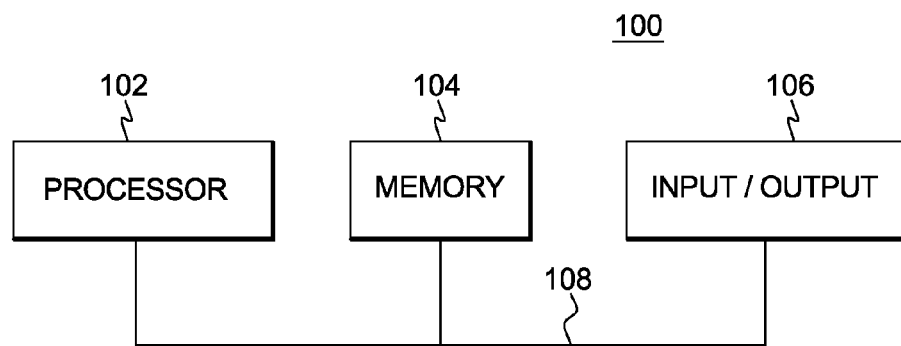
FIG. 1 depicts one example of a computing environment to incorporate and use one or more aspects of the present invention.

In accordance with an aspect of the present invention, a capability is provided for facilitating processing of character data, including, but not limited to, alphabetic characters, in any language; numeric digits; punctuation; and/or other symbols. The character data may or may not be strings of data. Associated with character data are standards, examples of which include, but are not limited to, ASCII (American Standard Code for Information Interchange); Unicode, including, but not limited to, UTF (Unicode Transformation Format) 8; UTF 16; etc.

In one example, a Find Element Equal instruction is provided that compares data of multiple vectors for equality and provides an indication of equality, if equality exists. In one example, an index associated with the equal element is stored in a target vector register.

As described herein, an element of a vector register (also referred to as a vector) is one, two or four bytes in length, as examples; and a vector operand is, for instance, a SIMD (Single Instruction, Multiple Data) operand having a plurality of elements. In other embodiments, elements can be of other sizes; and a vector operand need not be SIMD, and/or may include one element.

In a further embodiment, the same instruction, the Find Element Equal instruction, also searches a selected vector for null elements, also referred to as zero elements (e.g., entire element is zero). A null or zero element indicates termination of the character data; e.g., an end of a particular string of data. A result of the instruction is dependent on whether the null search is provided, or just the compare.

In yet a further embodiment, a Vector Find Any Equal instruction is provided that searches a vector for particular characters and/or for zero elements, and returns a mask or byte index of the matched character or zero element.

One embodiment of a computing environment to incorporate and use one or more aspects of the present invention is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which is also offered by International Business Machines Corporation and implements the z/Architecture. One embodiment of the z/Architecture is described in an IBM® publication entitled, "z/Architecture Principles of Operation," IBM® Publication No. SA22-7832-08, Ninth Edition, August, 2010, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.06 Revision B," International Business Machines Corporation, Jul. 23, 2010, which is hereby incorporated herein by reference in its entirety. POWER ARCHITECTURE® is a registered trademark of International Business Machines Corporation.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-041US, December 2011, and "Intel® 64 and IA-32 Architectures Developer's Manual: Vol. 2B, Instructions Set Reference, M-Z," Order Number 253667-041US, December 2011, each of which is hereby incorporated herein by reference in its entirety. Intel® is a registered trademark of Intel Corporation, Santa Clara, Calif.

Figure 2A:
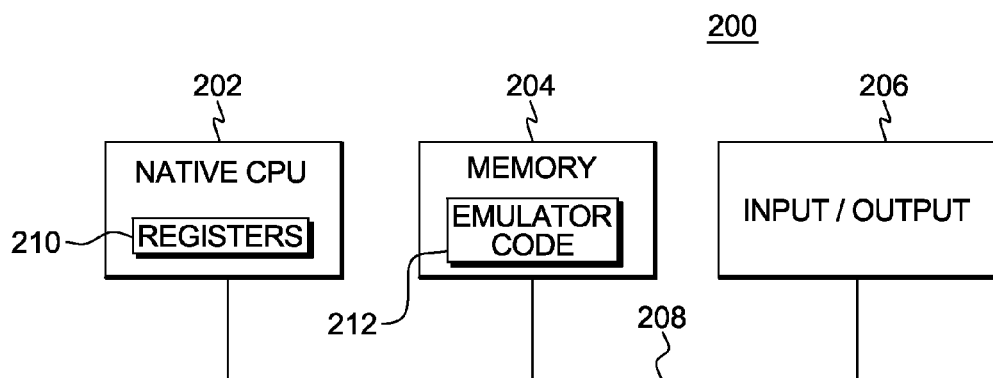
FIG. 2A depicts another example of a computing environment to incorporate and use one or more aspects of the present invention.

Another embodiment of a computing environment to incorporate and use one or more aspects of the present invention is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a pSeries server or an xSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the z/Architecture, such as PowerPC processors, pSeries servers, xSeries servers, HP Superdome servers or others, to emulate the z/Architecture and to execute software and instructions developed based on the z/Architecture.

Figure 2B:
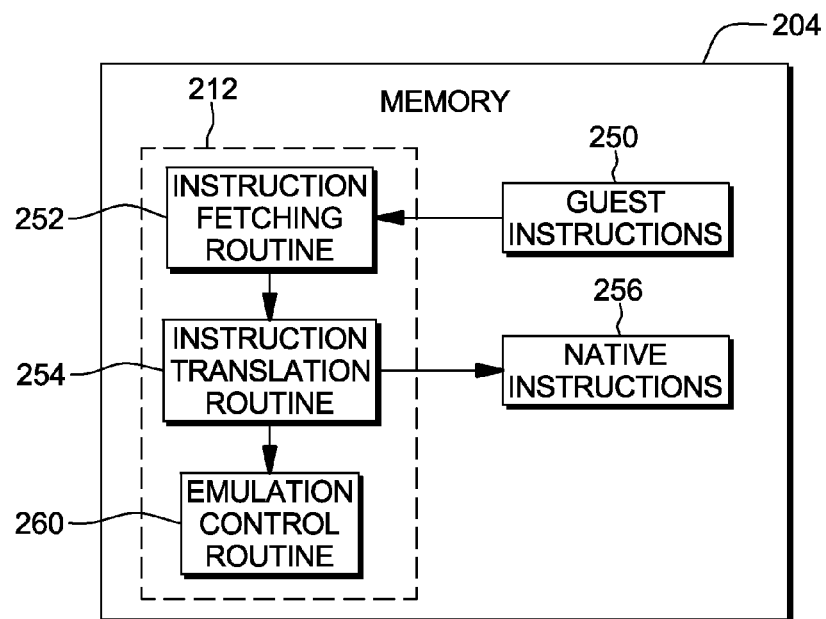
FIG. 2B depicts further details of the memory of FIG. 2A, in accordance with an aspect of the present invention.

Further details relating to emulator code 212 are described with reference to FIG. 2B. Guest instructions 250 comprise software instructions (e.g., machine instructions) that were developed to be executed in an architecture other than that of native CPU 202. For example, guest instructions 250 may have been designed to execute on a z/Architecture processor 102, but instead, are being emulated on native CPU 202, which may be, for example, an Intel Itanium II processor. In one example, emulator code 212 includes an instruction fetching unit 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is one of the instructions described herein. The instruction, which is of one architecture (e.g., the z/Architecture) is fetched from memory, translated and represented as a sequence of native instructions 256 of another architecture (e.g., PowerPC, pSeries, xSeries, Intel, etc.). These native instructions are then executed.

In one embodiment, the instructions described herein are vector instructions, which are part of a vector facility, provided in accordance with an aspect of the present invention. The vector facility provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur until processing of all the elements is complete.

As described herein, the vector instructions can be implemented as part of various architectures, including, but not limited to, the z/Architecture, Power, Intel, etc. Although an embodiment described herein is for the z/Architecture, the vector instructions and one or more aspects of the present invention may be based on many other architectures. The z/Architecture is only one example.

In one embodiment in which the vector facility is implemented as part of the z/Architecture, to use the vector registers and instructions, a vector enablement control and a register control in a specified control register (e.g., control register 0) are set to, for instance, one. If the vector facility is installed and a vector instruction is executed without the enablement controls set, a data exception is recognized. If the vector facility is not installed and a vector instruction is executed, an operation exception is recognized.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Many of the vector instructions provided with the vector facility have a field of specified bits. This field, referred to as the register extension bit or RXB, includes the most significant bit for each of the vector register designated operands. Bits for register designations not specified by the instruction are to be reserved and set to zero.

In one example, the RXB field includes four bits (e.g., bits 0-3), and the bits are defined, as follows:
    0—Most significant bit for the first vector register designation of the instruction.
    1—Most significant bit for the second vector register designation of the instruction, if any.
    2—Most significant bit for the third vector register designation of the instruction, if any.
    3—Most significant bit for the fourth vector register designation of the instruction, if any.

Each bit is set to zero or one by, for instance, the assembler depending on the register number. For instance, for registers 0-15, the bit is set to 0; for registers 16-31, the bit is set to 1, etc.

In one embodiment, each RXB bit is an extension bit for a particular location in an instruction that includes one or more vector registers. For instance, in one or more vector instructions, bit 0 of RXB is an extension bit for location 8-11, which is assigned to, e.g., $V_1$; bit 1 of RXB is an extension bit for location 12-15, which is assigned to, e.g., $V_2$; and so forth.

In a further embodiment, the RXB field includes additional bits, and more than one bit is used as an extension for each vector or location.

One instruction, provided in accordance with an aspect of the present invention that includes the RXB field is a Vector Find Element Equal instruction, an example of which is depicted in FIG. 3. In one example, the Vector Find Element Equal instruction 300 includes opcode fields 302a (e.g., bits 0-7), 302b (e.g., bits 40-47) indicating a Vector Find Element Equal operation; a first vector register field 304 (e.g., bits 8-11) used to designate a first vector register ($V_1$); a second vector register field 306 (e.g., bits 12-15) used to designate a second vector register ($V_2$); a third vector register field 308 (e.g., bits 16-19) used to designate a third vector register ($V_3$); a first mask field ($M_5$) 310 (e.g., bits 24-27); a second mask field ($M_4$) 312 (e.g., bits 32-35); and an RXB field 314 (e.g., bits 36-39). Each of the fields 304-314, in one example, is separate and independent from the opcode field(s). Further, in one embodiment, they are separate and independent from one another; however, in other embodiments, more than one field may be combined. Further information on the use of these fields is described below.

In one example, selected bits (e.g., the first two bits) of the opcode designated by opcode field 302a specify the length and format of the instruction. In this particular example, the selected bits indicate that the length is three halfwords and the format is a vector register- and register operation with an extended opcode. Each of the vector (V) fields, along with its corresponding register extension bit specified by RXB, designates a vector register. In particular, for vector registers, the register containing the operand is specified using, for instance, a four-bit field of the register field with the addition of the register extension bit (RXB) as the most significant bit. For instance, if the four bit field is 0110 and the extension bit is 0, then the five bit field 00110 indicates register number 6.

The subscript number associated with a field of the instruction denotes the operand to which the field applies. For instance, the subscript number 1 associated with vector register $V_1$ denotes the first operand, and so forth. A register operand is one register in length, which is, for instance, 128 bits.

The $M_4$ field having, for instance, four bits, 0-3, specifies an element size control in, for instance, bits 1-3. The element size control specifies the size of the elements in the vector register operands. As examples, the element size control specifies either a byte, halfword (e.g., 2 bytes) or word (e.g., 4 bytes). For instance, a 0 indicates a byte; a 1 indicates a halfword; and a 2 indicates a word, a.k.a., fullword. If a reserved value is specified, a specification exception is recognized.

The $M_5$ field, is, for instance, a four bit field, bits 0-3, including, for instance:

A zero search field (ZS, bit 2), which if one, each element of the second operand is compared to zero (or null). (In a further example, it is each element of the third operand or another operand that is compared to zero); and A condition code set field (CC, bit 3), which if zero, the condition code is not set and remains unchanged. If one, the condition code is set as specified below, as an example:

0—If the zero search bit is set, comparison detected a zero element in the second operand in an element with a smaller index than any equal comparisons.
  1—Comparison detected a match between the second and third operands in some element. If the zero search bit is set, this match occurred in an element with an index less than or equal to the zero comparing element.
  2— - - -
  3—No element compared equal.

In execution of one embodiment of the Vector Find Element Equal instruction, proceeding in one embodiment from left to right, the unsigned binary integer elements of the second operand (included within the register designated by $V_2$ plus its RXB bit) are compared with the corresponding unsigned binary integer elements of the third operand (included within the register designated by $V_3$ plus its RXB bit). If two elements are equal, a byte index of the first byte of the leftmost equal element is placed in a selected byte (e.g., byte 7) of the first operand (included within a register designated by $V_1$ plus its RXB bit). Zeros are stored in the remaining bytes of the first operand.

For instance, if the element size is one byte, then the byte index of the leftmost equal element is returned (e.g., if there are 16 elements, 0-15, and element 6 is equal, then byte index 6 is returned). Similarly, if the element size is halfword, and there are 8 elements, 0-7, and both byte 6 or 7 of element three is equal, then byte index 6 is returned. Likewise, if the element size is fullword and there are four elements, 0-3, and all of bytes 4-7 of element one is equal, byte index 4 is returned.

If no bytes are found to be equal, or zero if the zero search is set, then an index equal to the vector size (e.g., number of bytes; e.g., 16) is stored in the specified byte (e.g., byte 7) of the first operand. Zeros are stored in the remaining bytes.

If the zero search bit is set in the $M_5$ field, then each element in the second operand (or in another embodiment, another operand, such as operand three) is also compared for equality with zero (or null; end of string). If a zero element is found in the second operand before any other elements of the second and third operands are found to be equal, the byte index of the first byte of the element found to be zero is stored in the specified byte (e.g., byte 7) of the first operand and zeros are stored in all other byte locations. If the condition code set flag is one, then the condition code is set to zero.

In one embodiment, the comparison of the elements is performed in parallel. For instance, if the vector registers being compared are 16 bytes in length, then 16 bytes are compared in parallel. Further, in one embodiment, the direction of the vectors, left-to-right or right-to-left, is provided at runtime. For instance, the instruction accesses a register, status control or other entity that indicates the direction of processing as either left-to-right or right-to-left, as examples. In one embodiment, this direction control is not encoded as part of the instruction, but provided to the instruction at runtime.

In a further embodiment, the instruction does not include the RXB field. Instead, no extension is used or the extension is provided in another manner, such as from a control outside of the instruction, or provided as part of another field of the instruction.

Further details regarding one embodiment of processing the Vector Find Element Equal instruction are described with reference to FIG. 4. In one example, a processor of the computing environment is performing this logic.

Initially, a determination is made as to whether a search for null (a.k.a., zero element, end of string, terminator, etc.) is to be performed, INQUIRY 400. If a search for null is to be performed, a comparison is made against null characters, i.e., for zero elements, STEP 402, and the result is output to nullidx 403. For instance, if the element size is bytes and a zero element is found in byte 5, the index of the byte in which the zero element is found (e.g., 5) is placed in nullidx. Similarly, if the element size is halfword, and there are 8 elements, 0-7, and element three (i.e., bytes 6-7) is zero, then 6 (for byte index 6) is placed in nullidx. Likewise, if the element size is fullword and there are four elements, 0-3, and element one (i.e., bytes 4-7) is zero, then 4 (for byte index 4) is placed in nullidx. If no null element is found, then, in one example, the size of the vector (e.g., in bytes; e.g., 16) is placed in nullidx.

Additionally, or if no null search is to be performed, a plurality of comparisons (e.g., 16) are performed in parallel comparing A to B based on a compare operation, STEP 404. In one example, A is the contents of the second operand and B is the contents of the third operand, and the compare operation is equal.

A result of the compare is stored in a variable 406, referred to either as a left index, cmpidxl, or a right index, cmpidxr, depending on whether the search is from the left or the right. For instance, if the comparison is an equal comparison, the search is left-to-right, and the comparison results in one or more equalities, the index associated with the first byte of the lowest equal element is placed in cmpidxl. As one example, if the element size is bytes and there are 16 elements in the vector (0-15) and an equality is found in element 6, then 6 is stored in cmpidxl. Similarly, if the element size is halfwords, and there are 8 elements in the vector (0-7), and an equality is found in element 3 (e.g., at byte 6 or 7), the index of the first byte of the element (byte 6) is returned. Likewise, if the element size is fullword and there are four elements (0-3), and an equality is found in element 1 (e.g., at byte 4-7), the index of the first byte of the element (byte 4) is returned. If there are no equal comparisons, then, in one embodiment, cmpidxl or cmpidxr, depending on direction of the compare, is set equal to the size of the vector (e.g., in bytes; e.g., 16).

Thereafter, a determination is made as to whether the search is from the left or right, INQUIRY 408. If the search is from the left, a variable cmpidx is set equal to cmpidxl, STEP 410; otherwise, cmpidx is set equal to cmpidxr, STEP 412.

Subsequent to setting cmpidx, a determination is made as to whether a search was performed for null characters, INQUIRY 414. If there was no search for null characters, then a variable, idx, is set, for instance, or the compare index, cmpidx, STEP 416. If null was searched, then idx is set to the minimum of the compare index or the null index, nullidx, STEP 418. This concludes processing.

Figure 4:
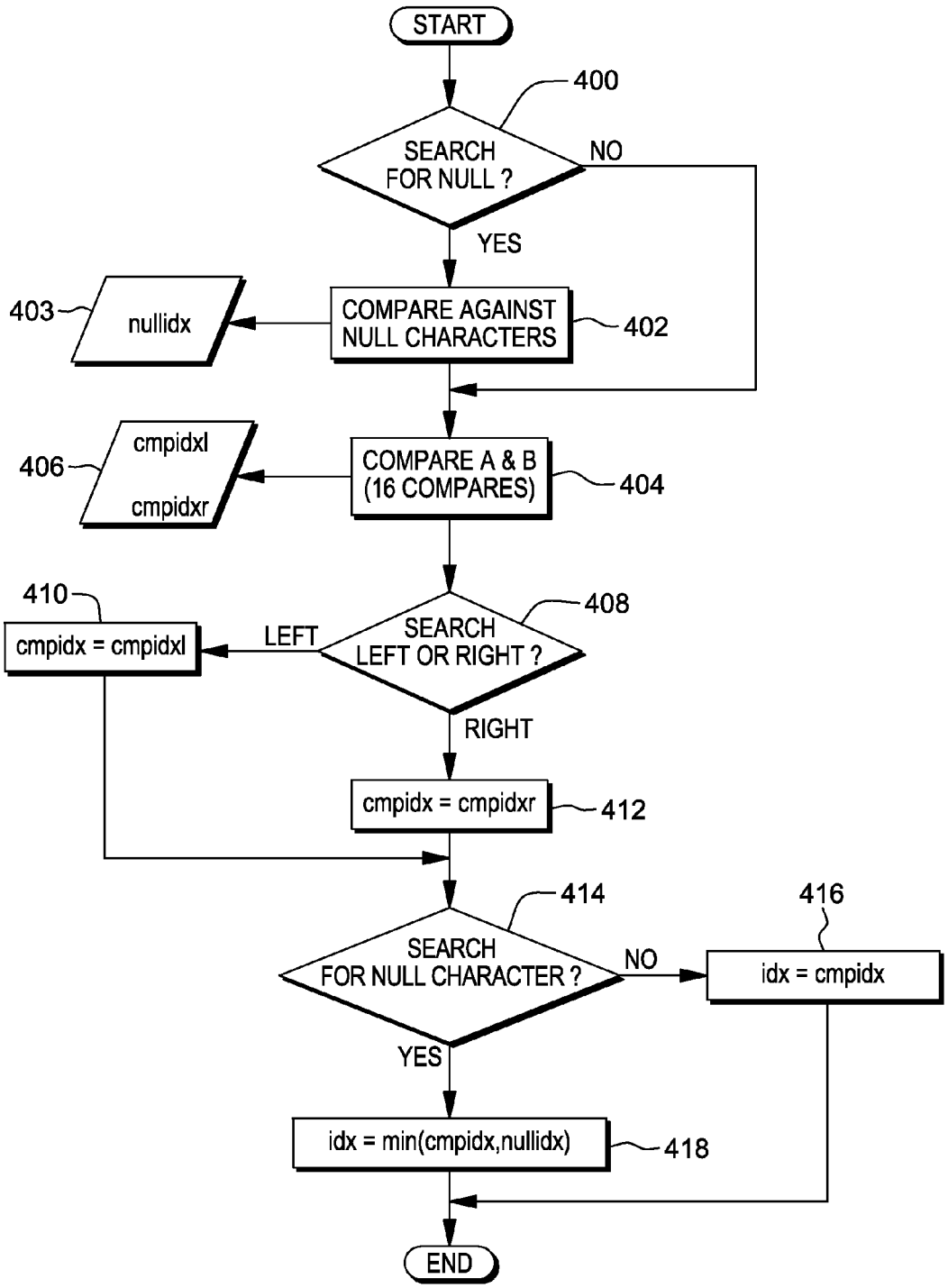
FIG. 4 depicts one embodiment of the logic associated with a Vector Find Element Equal instruction, in accordance with an aspect of the present invention.
Figure 5:
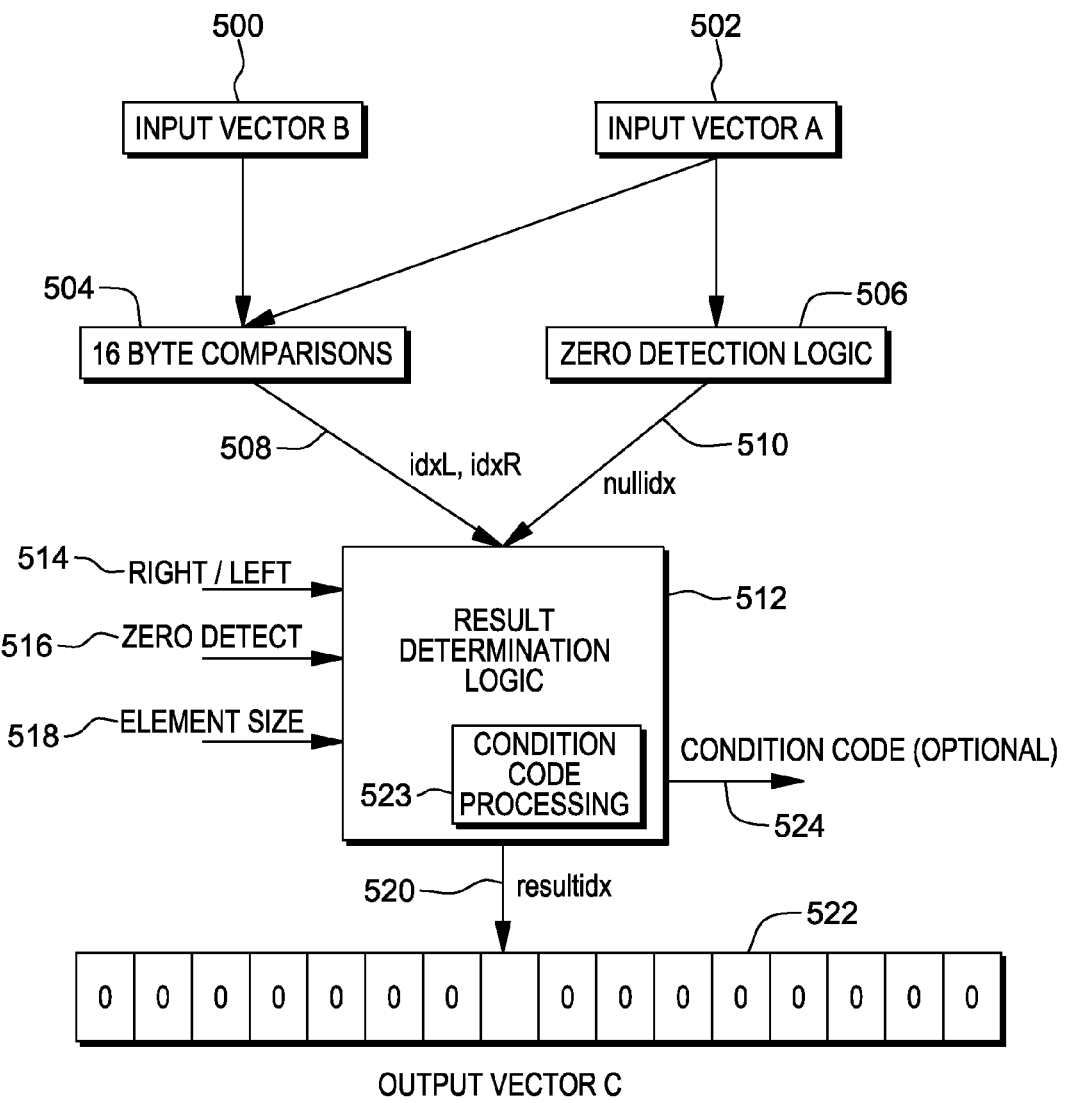
FIG. 5 depicts one embodiment of various processing blocks to perform the logic of FIG. 4, in accordance with an aspect of the present invention.

An example of block logic for the processing of FIG. 4 is depicted in FIG. 5. In this example, there are two inputs, Vector B 500 and Vector A 502. Both inputs are input to comparison logic 504, which performs the comparisons (e.g., equal) in parallel. Further, one input, Vector A, is also input to zero detection logic 506, which performs null processing.

The output of the comparison logic, idxL or idxR 508, is input to result determination logic 512, as well as the output of the zero detection logic, nullidx 510. The result determination logic also takes as input the following controls: right/left 514 indicating the direction of the search; zero detect 516 indicating whether null processing is to be performed; and element size 518 providing the size of each element (e.g., byte, halfword, word); and produces a resulting index 520, resultidx, which is stored in an output vector 522 (e.g., in byte 7).

Further, the result determination logic includes condition code processing 523, which optionally outputs a condition code 524.

Example pseudo-code for comparison logic 504 is as follows:

```
idxL = 16; idxR = 16
For i = 0 to vector_length
    If A[i] = to B[i] THEN
        idxL = i
    Done
For i = vector_length downto 0
    If A[i] = to B[i] THEN
        idxR = i
    done
```

As shown, variable idxL or idxR, depending on direction, is initialized to the size of the vector (e.g., in number of bytes; e.g., 16). Then, each element of Vector A is compared to a corresponding element of Vector B. In one example, the comparisons are byte comparisons, so a comparison is made for each of the 16 bytes (i). In this example, the comparison operation is equal, and if an equality is found, the index of the byte is stored in idxL if searching from left, or idxR if searching from right.

Example pseudo-code for zero detection logic 506 is as follows:

```
nullidx = 16
FOR j = 0 to vector_length
    IF A[j] == 0 THEN
        nullidx = j × element_size
    Done
```

As shown, each element (j) of the vector is tested to see if it is equal to zero. If an element is equal to zero, nullidx is set equal to the index of that element times the element size. For instance, if the element size if halfwords (2 bytes), and a null character is detected in element 3, 3 is multiplied by 2, and nullidx is set to 6, which represents byte 6. Similarly, if the element size is fullword (4 bytes), and a null character is detected in element 3, 3 is multiplied by 4, and nullidx is set to 12.

Likewise, example pseudo-code for result determination logic 512 is as follows:

```
IF Left/Right = Left THEN
    cmpidx = idxL
ELSE
    cmpidx = idxR
IF zero_detect = ON THEN
    resultidx = min(cmpidx, nullidx)
    IF set_CC = ON && nulldix<=cmpidx THEN
        CC = 0
ELSE
    resultidx = cmpidx
IF element_size = byte THEN element_size_mask = '11111'b
IF element_size = 2byte THEN element_size_mask = '11110'b
IF element_size = 4byte THEN element_size_mask = '11100'b
resultidx = resultidx & element_size_mask
IF SetCC = ON THEN
    IF nullidx < cmpidx THEN
        CC = 0
    ELSE IF cmpidx < 16 THEN
        CC = 1
    ELSE
        CC = 3
```

As shown, if the left/right control indicates left, then cmpidx is set equal to idxL; otherwise, cmpidx is set equal to idxR. Further, if the zero detect indicator is on, then resultidx is set equal to the minimum of cmpidx or nullidx; and if the condition code set control is on and cmpidx is greater than nullidx, the condition code is set to zero. Otherwise, if zero detect is not on, resultidx is set equal to cmpidx.

Further, if element size is equal to byte, then an element size mask is set to |11111|; if element size is equal to 2 bytes, the mask is set to |11110|, and if element size is equal to 4 bytes, the mask is set to |11100|.

Thereafter, resultidx is set equal to resultidx ANDed with element size mask. For instance, if element size is halfword and byte 7 is resultidx, then resultidx=00111 AND 11110, providing 00110; so resultidx is set equal to 6 (i.e., 00110 in binary), which is the first byte of the element.

Additionally, a condition code is optionally set. If the set condition code control of the instruction is set on, then a condition code is provided; otherwise, no condition code is set. As examples, if the control is set on, then if nullidx<cmpidx, the condition code is set to 0. Otherwise, if cmpidx<16, then the condition code is set to 1; else, the condition code is set to 3.

Described above is one example of a vector instruction used to facilitate character data processing. As described herein, for a 128 bit vector, the comparison logic only performs 16 byte compares, rather than, for instance, 256 compares. This provides for scaling for larger vectors. Further, a left/right control may be provided as a runtime value and not encoded within the instruction. Yet further, the value returned as the result is a byte position, rather than an element index. Further, 4 byte compares along with 1 byte and 2 byte compares are supported.

Figure 6:
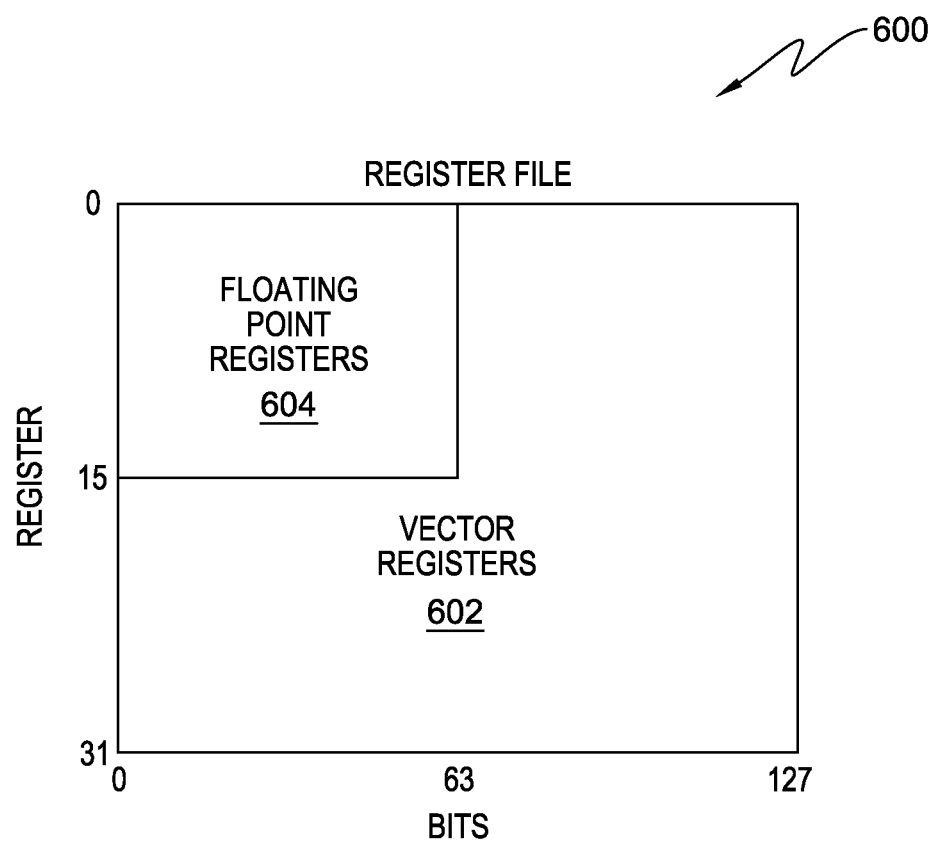
FIG. 6 depicts one example of a register field, in accordance with an aspect of the present invention.

In one embodiment, there are 32 vector registers and other types of registers can map to a quadrant of the vector registers. For instance, as shown in FIG. 6, if there is a register file 600 that includes 32 vector registers 602 and each register is 128 bits in length, then 16 floating point registers 604, which are 64 bits in length, can overlay the vector registers. Thus, as an example, when floating point register 2 is modified, then vector register 2 is also modified. Other mappings for other types of registers is also possible.

In a further aspect of the invention, another instruction provided with the vector facility and used in accordance with an aspect of the present invention is a Vector Find Any Equal instruction, in which all characters (or a subset in another embodiment) in an input vector are compared to each character (or selected characters) in another input vector. Output is recorded either as a mask or an index to a character that matched. This is useful, for instance, when parsing character data, such as strings of data. When parsing, one operation that is performed is to look for several special characters before proceeding to the next parsing step. This instruction enables searching for several characters at once.

Figure 7:
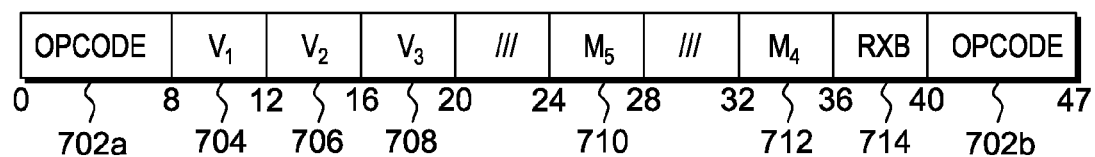
FIG. 7 depicts one embodiment of a format of a Vector Find Any Equal instruction, in accordance with an aspect of the present invention.

An example of the Vector Find Any Equal instruction is depicted in FIG. 7, in which in one embodiment, a Vector Find Any Equal instruction 700 includes, for instance, opcode fields 702*a* (e.g., bits 0-7), 702*b* (e.g., bits 40-47) indicating a Vector Find Any Equal operation; a first vector register field 704 (e.g., bits 8-11) used to designate a first vector register ($V_1$); a second vector register field 706 (e.g., bits 12-15) used to designate a second vector register ($V_2$); a third vector register field 708 (e.g., bits 16-19) used to designate a third vector register ($V_3$); a first mask field ($M_5$) 710 (e.g., bits 24-27); a second mask field ($M_4$) (e.g., bits 32-35) 712; and an RXB field 714 (e.g., bits 36-39). Each of the fields 704-714, in one example, is separate and independent from the opcode field(s). Further, in one embodiment, they are separate and independent from one another; however, in other embodiments, more than one field may be combined. Further information on the use of these fields is described below.

Similar to above, in this example, selected bits (e.g., the first two bits) of the opcode designated by opcode field 702*a* specify the length and format of the instruction. In this example, the selected bits indicate that the length is three halfwords and the format is a vector register—and register operation with an extended opcode field. Each of the vector (V) fields, along with its corresponding extension bit specified by RXB, designates a vector register. In particular, for vector registers, the register containing the operand is specified using, for instance, a four-bit field of the register field with the addition of the register extension bit (RXB) as the most significant bit. For instance, if the four bit field is 0110 and the extension bit is 0, then the five bit field 00110 indicates register number 6.

The subscript number associated with a field of the instruction denotes the operand to which the field applies. For instance, the subscript number 1 associated with vector register $V_1$ denotes the first operand, and so forth. A register operand is one register in length, which is, for instance, 128 bits.

The $M_4$ field having, for instance, four bits, 0-3, specifies the element size control in, for instance, bits 1-3. The element size control specifies the size of the elements in the vector register operands. In one example, the element size control specifies a byte, halfword (e.g., 2 bytes) or word (e.g., 4 bytes). For instance, a 0 indicates a byte; a 1 indicates a halfword; and a 2 indicates a word, a.k.a., a fullword. If a reserved value is specified, a specification exception is recognized.

The $M_5$ field is, for instance, a four bit field, bits 0-3, including, for instance:

A result type field (RT, bit 1), which if zero, each resulting element is a mask of all range comparisons on that element. If one, a byte index is stored into a specified byte (e.g., byte 7) of the first operand and zeros are stored in all other elements;

A zero search field (ZS, bit 2), which if one, each element of the second operand (or another operand) is compared to zero; and A condition code set field (CC, bit 3), which if zero, the condition code is not set and remains unchanged. If one, the condition code is set as follows, in one example:

0—If the zero search bit is set, there were no matches in a lower index element than zero in the second operand.

1—Some elements of the second operand match at least one element in the third operand;

2—All elements of the second operand match at least one element in the third operand; and 3—No elements of the second operand match any elements in the third operand.

In execution of one embodiment of the Vector Find Any Equal instruction, proceeding, in one example, from left to right, every unsigned binary integer element of the second operand (included within a register designated by $V_2$ plus RXB) is compared for equality with each unsigned binary integer element of the third operand (included within a register designated by $V_3$ plus RXB) and optionally, zero, if the zero search flag is set in the $M_5$ field.

If the result type flag in the $M_5$ field is zero, then for each element in the second operand that matches any element in the third operand, or optionally zero, the bit positions of the corresponding element in the first operand (included within a register designated by $V_1$ plus RXB) are set to ones; otherwise, they are set to zero.

If the result type flag in the $M_5$ field is one, then a byte index of the leftmost element (e.g., a byte index of the first byte of the element) in the second operand that matches an element in the third operand or zero is stored in the specified byte (e.g., byte 7) of the first operand.

If the result type flag in the $M_5$ field is one and no bytes are found to be equal, or zero if the zero search flag is set, then an index equal to the size of the vector (e.g., number of bytes; e.g., 16) is stored in the specified byte (e.g., byte 7) of the first operand.

In one embodiment, the direction of the vectors, left-to-right or right-to-left, is provided at runtime. For instance, the instruction accesses a register, status control or other entity that indicates the direction of processing as either left-to-right or right-to-left, as examples. In one embodiment, this direction control is not encoded as part of the instruction, but provided to the instruction at runtime.

In a further embodiment, the instruction does not include the RXB field. Instead, no extension is used or the extension is provided in another manner, such as from a control outside of the instruction, or provided as part of another field of the instruction.

Figure 8:
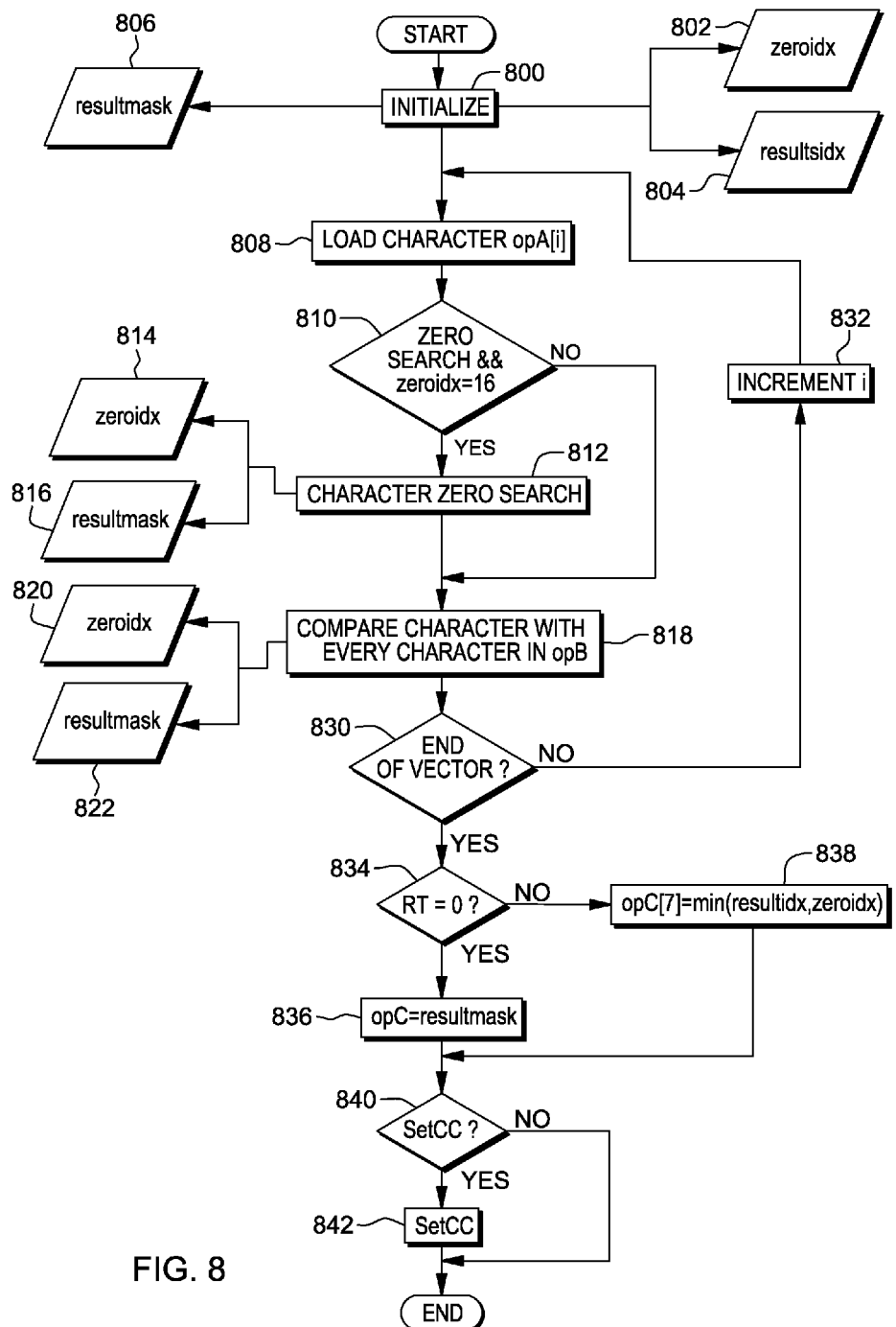
FIG. 8 depicts one embodiment of the logic associated with a Vector Find Any Equal instruction, in accordance with an aspect of the present invention.

Further details regarding one embodiment of the Vector Find Any Equal instruction are described with reference to FIG. 8. In one example, a processor of the computing environment is performing this logic.

Initially, variables referred to as zeroidx 802, resultidx 804 and resultmask 806 are initialized, STEP 800. For instance, zeroidx is set equal to the size of the second operand (e.g., 16); resultidx is set equal to the size of the second operand (e.g., 16); and resultmask is set equal to all zeros. Resultmask, in one embodiment, includes 128 bits corresponding to the 128 bits of the second operand.

Thereafter, a character (i.e., an element) is loaded from an operand, referred to herein as opA, which is, for instance, the second operand of the instruction, STEP 808. Thereafter, a determination is made as to whether the zero search field is set indicating a zero search and zeroidx is set equal to 16, INQUIRY 810. If so, a zero search is performed, STEP 812, and the result is output to zeroidx 802 and resultmask 806. For instance, a byte index of the leftmost byte of the zero element is indicated in zeroidx, and the bits corresponding to that element in resultmask are set to one. For instance, for zeroidx, if the element size is bytes and a zero element is found in byte 5, the index of the byte in which the zero element is found (e.g., 5) is placed in zeroidx. Similarly, if the element size is halfword, and there are 8 elements, 0-7, and element three (i.e., bytes 6-7) is zero, then 6 (for byte index 6) is placed in zeroidx. Likewise, if the element size is fullword and there are four elements, 0-3, and element one (i.e., bytes 4-7) is zero, then 4 (for byte index 4) is placed in zeroidx. If no null element is found, then, in one example, the size of the vector (e.g., in bytes; e.g., 16) is placed in zeroidx.

Thereafter, or if a zero search is not to be performed, then the loaded character is compared with every character in an operand, referred to herein as opB, which is, for instance, the third operand in the instruction, STEP 818. If there is a match, the match is indicated in resultidx 804 and resultmask 806. For instance, resultidx is set equal to the first byte of the element that matches, and the bits in resultmask corresponding to the element are set equal to one. As one example, for resultidx, if the element size is bytes and there are 16 elements in the vector (0-15) and an equality is found in element 6, then 6 is stored in resultidx. Similarly, if the element size is halfwords, and there are 8 elements in the vector (0-7), and an equality is found in element 3 (e.g., at byte 6 or 7), the index of the first byte of the element (byte 6) is returned. Likewise, if the element size is fullword and there are four elements (0-3), and an equality is found in element 1 (e.g., at byte 4-7), the index of the first byte of the element (byte 4) is returned. If there are no equal comparisons, then, in one embodiment, resultidx is set equal to the size of the vector (e.g., in bytes; e.g., 16).

Thereafter, a determination is made as to whether the end of opA has been reached, INQUIRY 830. If not, then variable i is incremented, e.g., by one, STEP 832, and processing continues with STEP 808. Otherwise, processing continues with determining whether the result type is equal to zero, INQUIRY 834. If the result type is equal to zero, then an operand referred to herein as opC, which is, for instance the first operand of the instruction, is set equal to resultmask, STEP 836. Otherwise, a specified byte (e.g., byte 7) of opC is set equal to the minimum of resultidx and zeroidx (and the other bytes are set to zero), STEP 838.

Subsequent to placing the result in opC, a determination is made as to whether the condition code set field indicates that the condition code is to be set, INQUIRY 840. If condition code set field is set to one, then the condition code is set, STEP 842. For instance, the condition code is set to zero if the ZS field is set and there were no matches in a lower indexed element than zero in the second operand; set to one if some elements of the second operand match at least one element in the third operand; set to 2 if all elements of the second operand matched at least one element in the third operand; and set to 3 if no elements of the second operand match any elements in the third operand. Otherwise, if condition code set field is equal to zero, then no condition code is set.

As described herein, in one embodiment, a Vector Find Any Equal instruction is provided that is able to toggle between providing and not providing a zero search, and is conditionally able to return a byte index of either a zero element or an equal element. This byte index is the first byte of the element being reported. If a zero element is searched, then the position of that zero element may be provided. Thus, one instruction having one particular opcode is provided in which that instruction is able to perform a compare with a zero search or a compare with no zero search.

Described above are examples of vector instructions used to facilitate character data processing. As described herein, for the Find Vector Element Equal instruction with 128 bit vectors, the comparison logic only performs 16 byte compares, rather than, for instance, 256 compares. This provides for scaling for larger vectors. Further, for either the Vector Find Element Equal or Vector Find Any Equal instruction, a left/right control may be provided as a runtime value and not encoded within the instruction. Yet further, the value returned as the result is a byte position, rather than an element index. Further, 4 byte compares along with 1 byte and 2 byte compares are supported.

In accordance with an aspect of the present invention, a condition code is optionally provided based on a control provided with the instruction. By allowing the condition code to be set, scheduling of an instruction is facilitated.

In a further embodiment, the zero search is not a condition, but instead, is performed when the instruction is executed. Based on or responsive to executing the instruction, the zero search is performed and, in one example, the position (e.g., byte index) of the zero element is returned and/or the position (e.g., byte index) of the first matched element. In one embodiment, the number of compares that are performed, regardless of embodiment, for the Vector Find Element Equal instruction corresponds to the number of bytes of the vector. For instance, if the vector being searched or compared is 16 bytes, then at most 16 compares are performed, e.g., in parallel. In a further embodiment, once a match or zero element is found, the comparing ceases.

Herein, memory, main memory, storage and main storage are used interchangeably, unless otherwise noted explicitly or by context.

Additional details relating to the vector facility, including examples of other instructions, are provided as part of this Detailed Description further below.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 9:
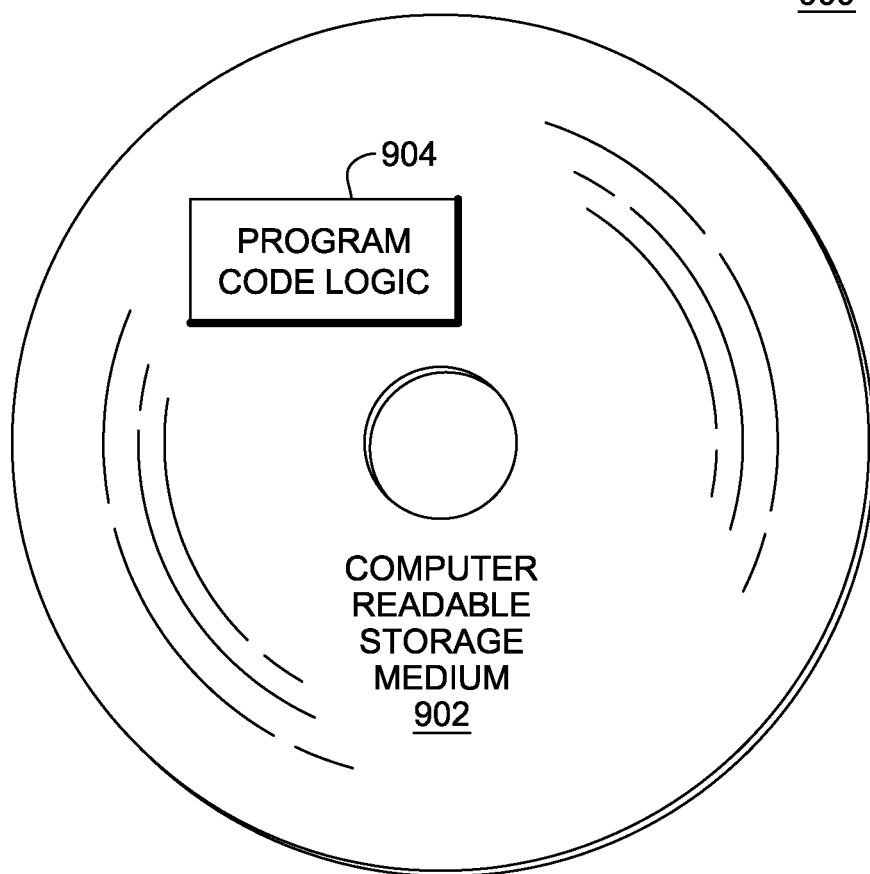
FIG. 9 depicts one embodiment of a computer program product incorporating one or more aspects of the present invention.

Referring now to FIG. 9, in one example, a computer program product 900 includes, for instance, one or more non-transitory computer readable storage media 902 to store computer readable program code means or logic 904 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, vectors of other sizes may be used, and changes to the instructions may be made without departing from the spirit of the present invention. Additionally, registers other than vector registers may be used, and/or data may be other than character data, such as integer data or other types of data.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 10:
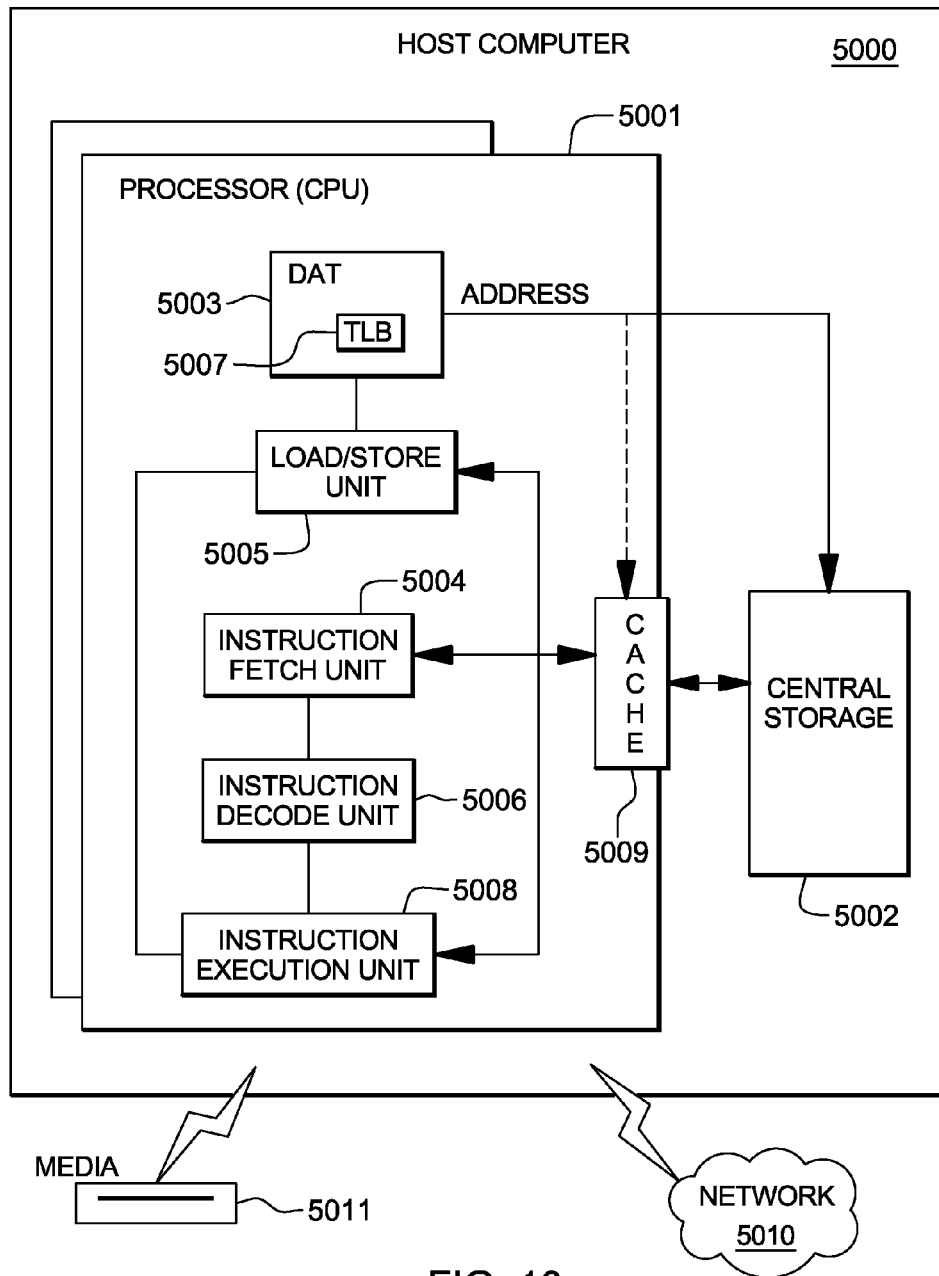
FIG. 10 depicts one embodiment of a host computer system to incorporate and use one or more aspects of the present invention.

Referring to FIG. 10, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with one or more aspects the present invention). Referring to FIG. 10, software program code which embodies one or more aspects of the present invention may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 11:
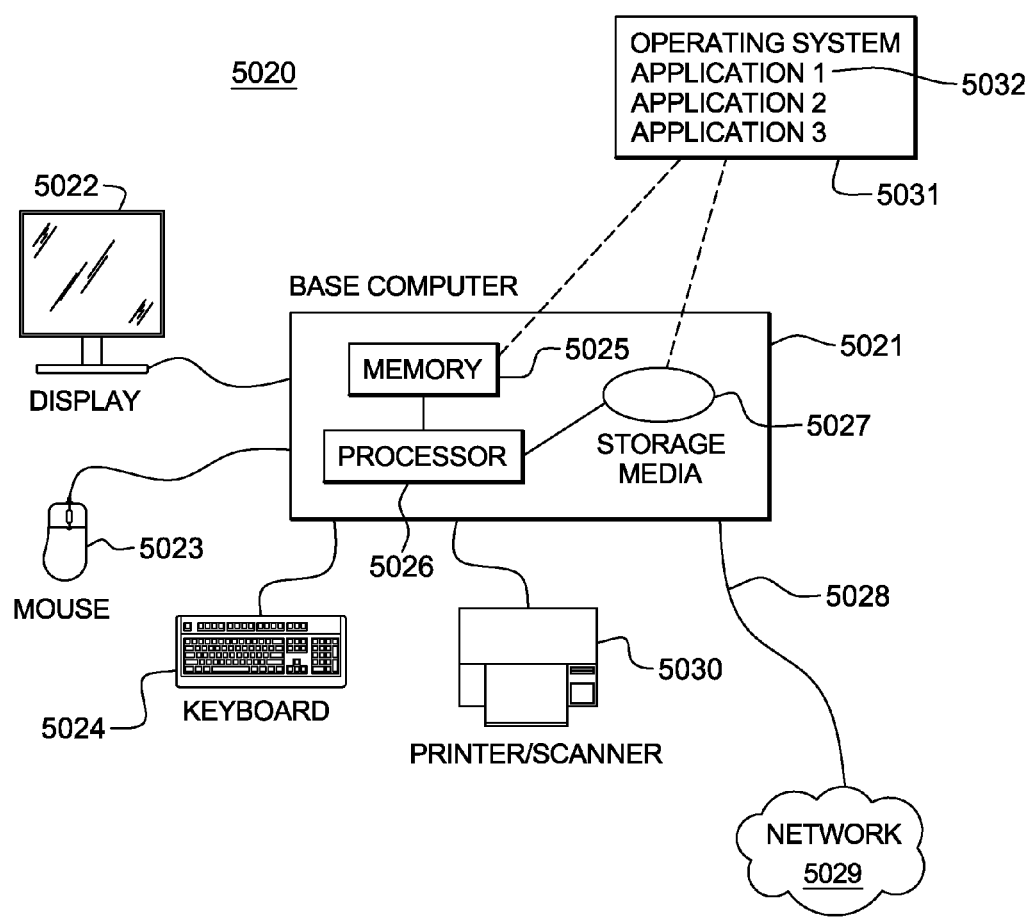
FIG. 11 depicts a further example of a computer system to incorporate and use one or more aspects of the present invention.

FIG. 11 illustrates a representative workstation or server hardware system in which one or more aspects of the present invention may be practiced. The system 5020 of FIG. 11 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 12:
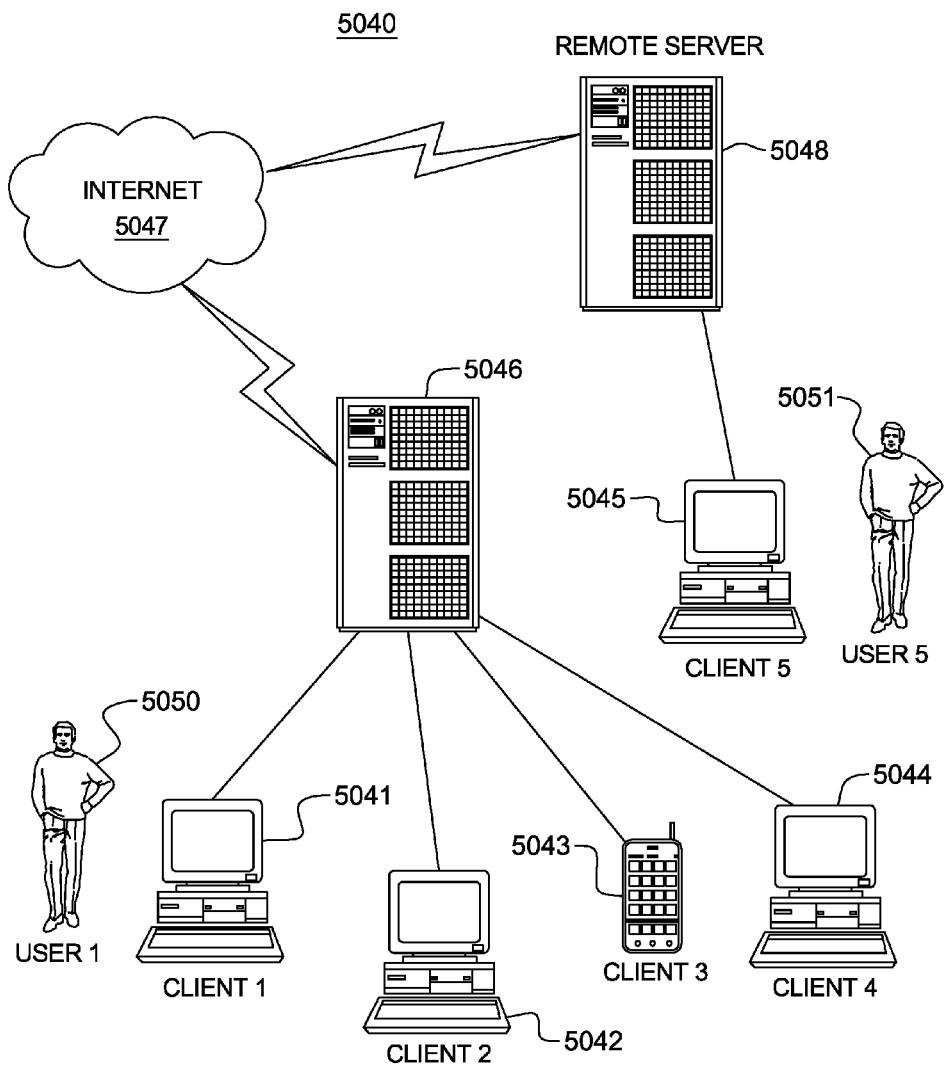
FIG. 12 depicts another example of a computer system comprising a computer network to incorporate and use one or more aspects of the present invention.

FIG. 12 illustrates a data processing network 5040 in which one or more aspects of the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 12, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z server available from International Business Machines Corporation.

Referring concurrently to FIG. 11 and FIG. 12, software programming code which may embody one or more aspects of the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 13:
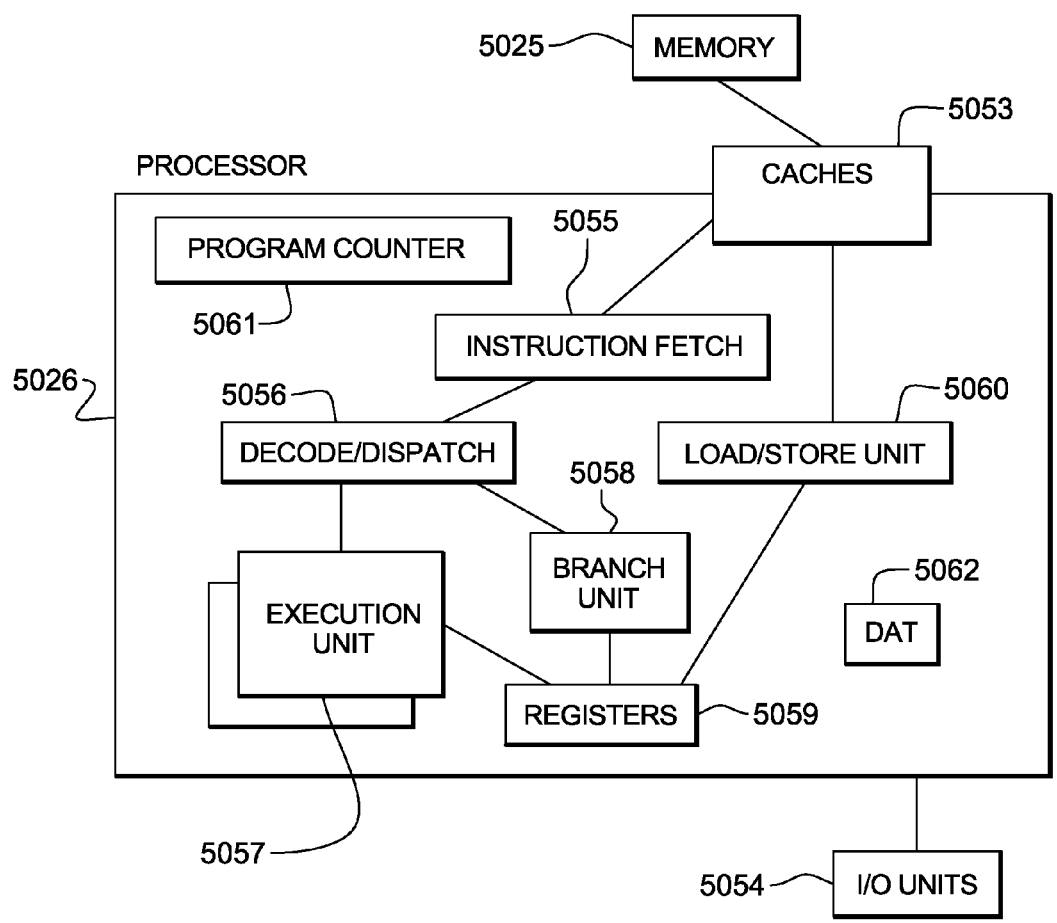
FIG. 13 depicts one embodiment of various elements of a computer system to incorporate and use one or more aspects of the present invention.

Referring to FIG. 13, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 14A:
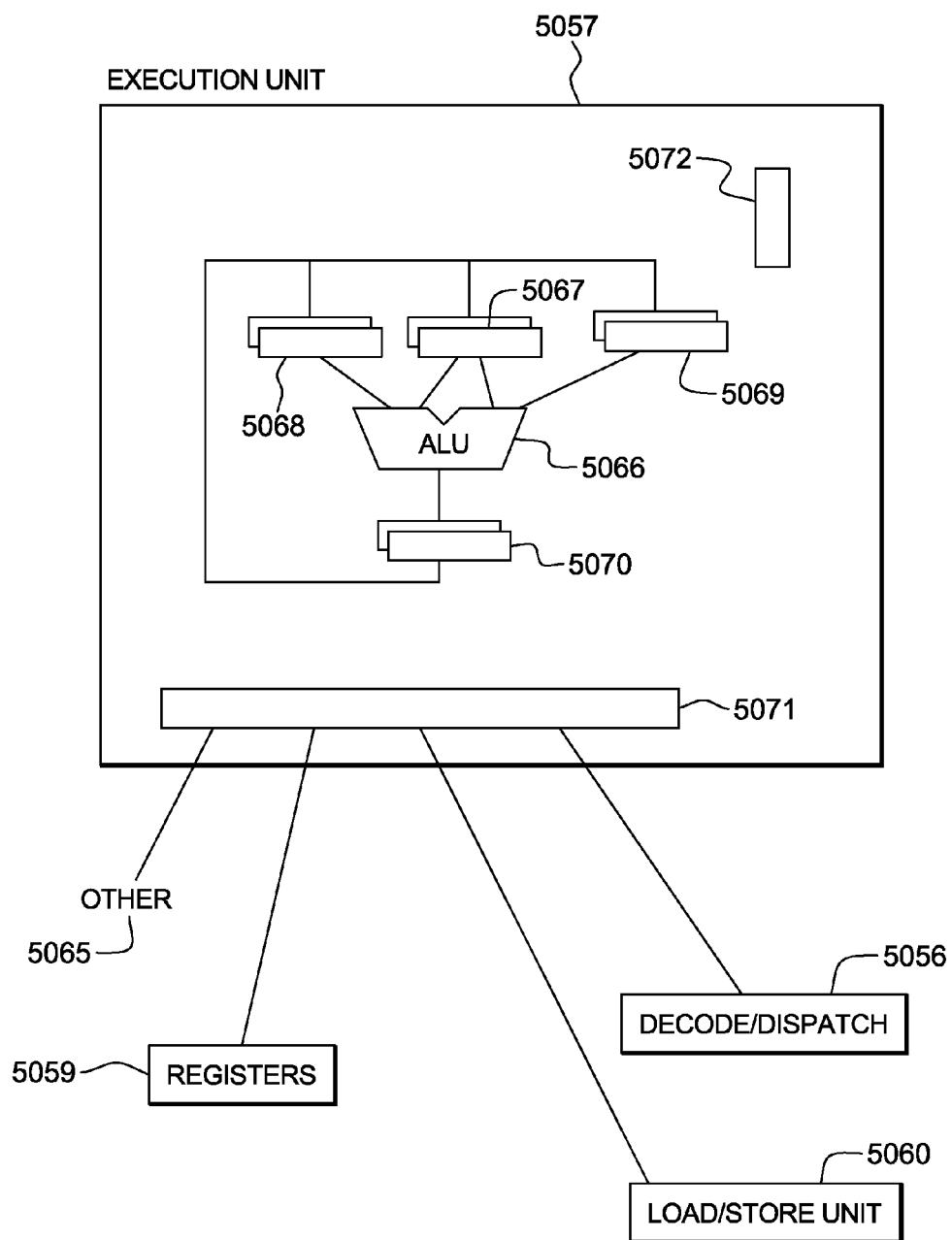
FIG. 14A depicts one embodiment of the execution unit of the computer system of FIG. 13 to incorporate and use one or more aspects of the present invention.

A processor 5026 typically has one or more units 5057, 5058, 5060 for executing the function of the instruction. Referring to FIG. 14A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 14B:
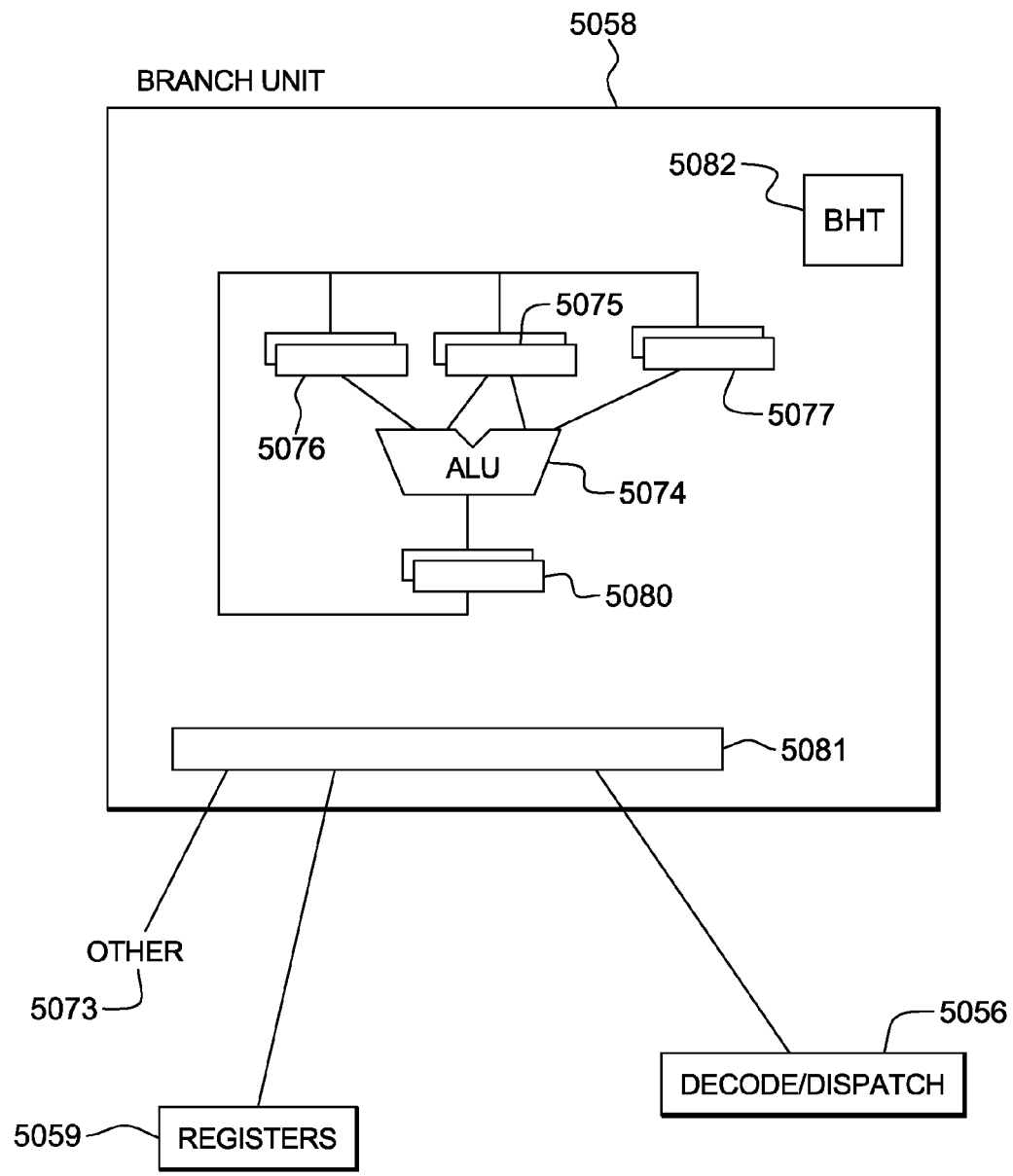
FIG. 14B depicts one embodiment of the branch unit of the computer system of FIG. 13 to incorporate and use one or more aspects of the present invention.

Referring to FIG. 14B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 14C:
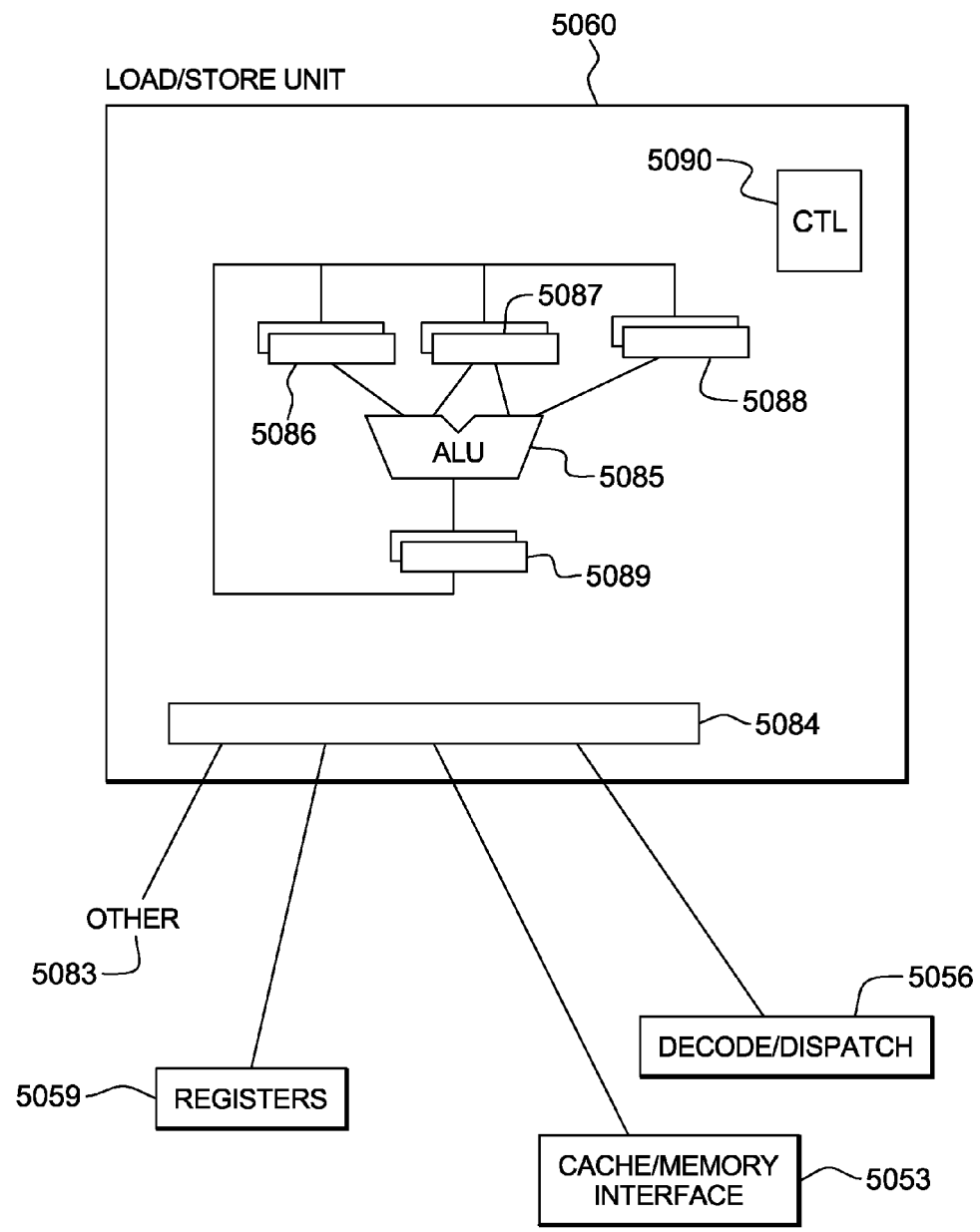
FIG. 14C depicts one embodiment of the load/store unit of the computer system of FIG. 13 to incorporate and use one or more aspects of the present invention.

Referring to FIG. 14C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 13) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 15:
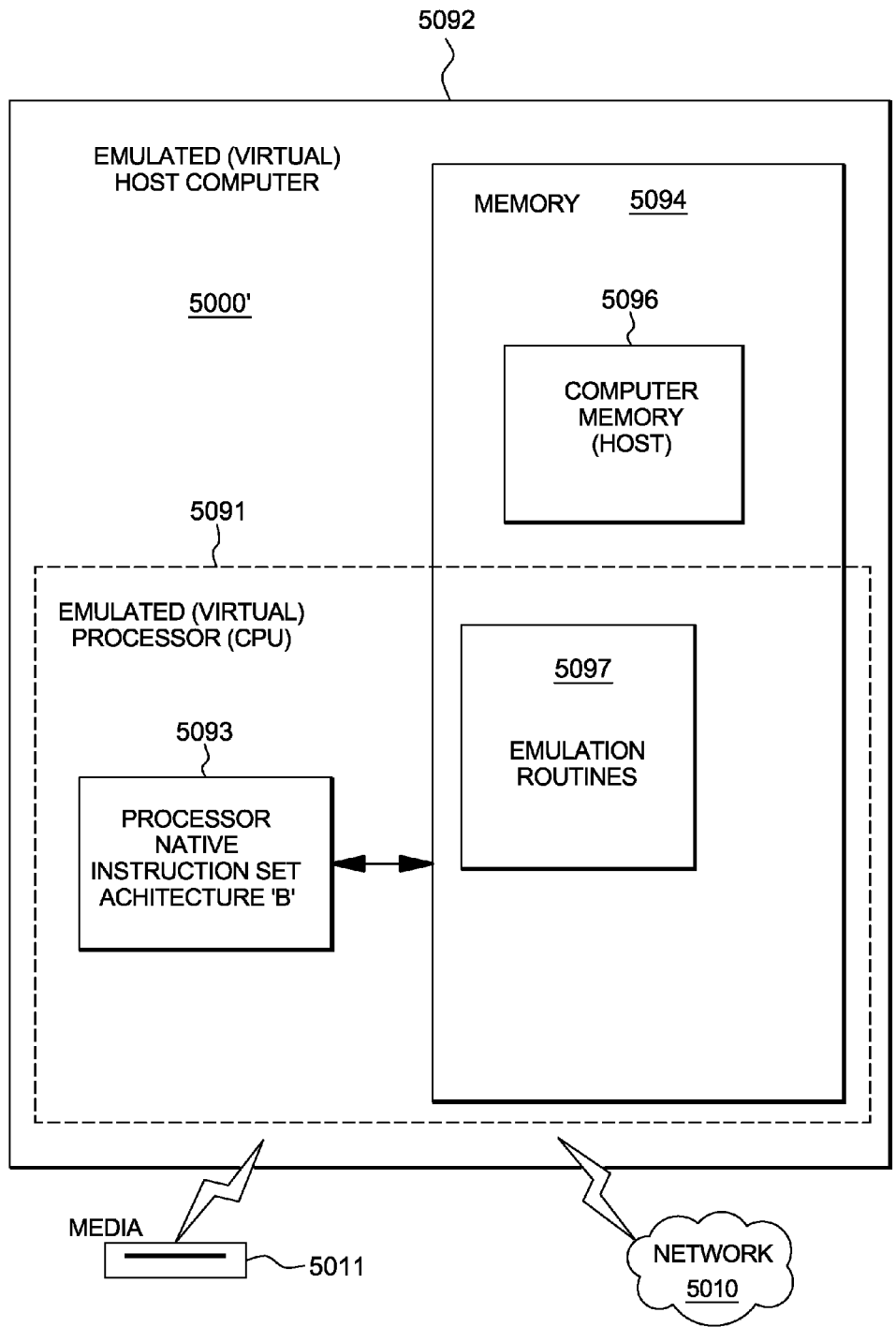
FIG. 15 depicts one embodiment of an emulated host computer system to incorporate and use one or more aspects of the present invention.

In FIG. 15, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Chapter 23. Vector String Instructions
Vector String Facility

.
.
.

Instructions

Unless otherwise specified all operands are vector-register operands. A "V" in the assembler syntax designates a vector operand.

| Name | Mnemonic | Characteristics | Op-code | Page |
|---|---|---|---|---|
| VECTOR FIND ANY EQUAL | VFAE | VRR-b C* VF | $O^9$ SP Dv | E782 | 23-1 |
| VECTOR FIND ELEMENT EQUAL | VFEE | VRR-b C* VF | $O^9$ SP Dv | E780 | 23-2 |
| VECTOR FIND ELEMENT NOT EQUAL | VFENE | VRR-b C* VF | $O^9$ SP Dv | E781 | 23-3 |
| VECTOR STRING RANGE COMPARE | VSTRC | VRR-d C* VF | $O^9$ SP Dv | E78A | 23-4 |

Vector Find any Equal

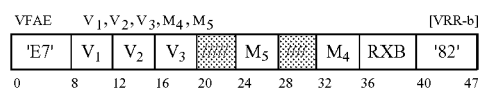

Proceeding from left to right, every unsigned binary integer element of the second operand is compared for equality with each unsigned binary integer element of the third operand and optionally zero if the Zero Search flag is set in the $M_5$ field.

If the Result Type (RT) flag in the $M_5$ field is zero, then for each element in the second operand that matches any element in the third operand, or optionally zero, the bit positions of the corresponding element in the first operand are set to ones, otherwise they are set to zero.

If the Result Type (RT) flag in the $M_5$ field is one, then the byte index of the leftmost element in the second operand that matches an element in the third operand or zero is stored in byte seven of the first operand.

Each instruction has an Extended Mnemonic section which describe recommended extended mnemonics and their corresponding machine assembler syntax.
Programming Note:

For all instructions that optionally set the condition code, performance may be degraded if the condition code is set.

If the result Type (RT) flag in the $M_5$ field is one and no bytes are found to be equal, or zero if the zero search flag is set, an index equal to the number of bytes in the vector is stored in byte seven of the first operand.

The $M_4$ field specifies the element size control (ES). The ES control specifies the size of the elements in the vector register operands. If a reserved value is specified, a specification exception is recognized.
0—Byte
1—Halfword
2—Word
3-15—Reserved The $M_5$ field has the following format:

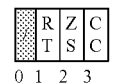

The bits of the $M_5$ field are defined as follows:
Result Type (RT): If zero, each resulting element is a mask of all range comparisons on that element. If one, a byte index is stored into byte seven of the first operand and zeros are stored in all other elements.
Zero Search (ZS): If one, each element of the second operand is also compared to zero.

Condition Code Set (CC): If zero, the condition code is not set and remains unchanged. If one, the condition code is set as specified in the following section.

Special Conditions

A specification exception is recognized and no other action is taken if any of the following occurs:
1. The M4 field contains a value from 3-15.
2. Bit 0 of the M5 field are not zero.

Resulting Condition Code:
If the CC flag is zero, the code remains unchanged.
If the CC flag is one, the code is set as follows:
0 If the ZS-bit is set, there were no matches in a lower indexed element than zero in the second operand.
1 Some elements of the second operand match at least one element in the third operand
2 All elements of the second operand matched at least one element in the third operand
3 No elements in the second operand match any elements in the third operand Program Exceptions:
1 Data with DXC FE, Vector Register
  Operation if the vector-extension facility is not installed
  Specification (Reserved ES value)
  Transaction Constraint Extended Mnemonics:

| VFAEB | $V_1, V_2, V_3, M_5$ | VFAE | $V_1, V_2, V_3, 0, M_5$ |
| VFAEH | $V_1, V_2, V_3, M_5$ | VFAE | $V_1, V_2, V_3, 1, M_5$ |
| VFAEF | $V_1, V_2, V_3, M_5$ | VFAE | $V_1, V_2, V_3, 2, M_5$ |
| VFAEBS | $V_1, V_2, V_3, M_5$ | VFAE | $V_1, V_2, V_3, 0, (M_5|X'1')$ |
| VFAEHS | $V_1, V_2, V_3, M_5$ | VFAE | $V_1, V_2, V_3, 1, (M_5|X'1')$ |
| VFAEFS | $V_1, V_2, V_3, M_5$ | VFAE | $V_1, V_2, V_3, 2, (M_5|X'1')$ |
| VFAEZB | $V_1, V_2, V_3, M_5$ | VFAE | $V_1, V_2, V_3, 0, (M_5|X'2')$ |
| VFAEZH | $V_1, V_2, V_3, M_5$ | VFAE | $V_1, V_2, V_3, 1, (M_5|X'2')$ |
| VFAEZF | $V_1, V_2, V_3, M_5$ | VFAE | $V_1, V_2, V_3, 2, (M_5|X'2')$ |
| VFAEZBS | $V_1, V_2, V_3, M_5$ | VFAE | $V_1, V_2, V_3, 0, (M_5|X'3')$ |
| VFAEZHS | $V_1, V_2, V_3, M_5$ | VFAE | $V_1, V2, V3, 1, (M_5|X'3')$ |
| VFAEZFS | $V_1, V_2, V_3, M_5$ | VFAE | $V_1, V_2, V_3, 2, (M_5|X'3')$ |

Vector Find Element Equal

| VFEE | $V_1,V_2,V_3,M_4,M_5$ | | | | | | [VRR-b]] |
|---|---|---|---|---|---|---|---|
| 'E7' | $V_1$ | $V_2$ | $V_3$ | $M_5$ | $M_4$ | RXB | '80' |
| 0 | 8 | 12 | 16 | 20  24 | 28  32 | 36 | 40  47 |

Proceeding from left to right, the unsigned binary integer elements of the second operand are compared with the corresponding unsigned binary integer elements of the third operand. If two elements are equal, the byte index of the first byte of the leftmost equal element is placed in byte seven of the first operand. Zeros are stored in the remaining bytes of the first operand. If no bytes are found to be equal, or zero if the zero compare is set, then an index equal to the number of bytes in the vector is stored in byte seven of the first operand. Zeros are stored in the remaining bytes.

If the Zero Search (ZS) bit is set in the $M_5$ field, then each element in the second operand is also compared for equality with zero. If a zero element is found in the second operand before any other elements of the second and third operands are found to be equal, the byte index of the first byte of the element found to be zero is stored in byte seven the first operand and zeros are stored in all other byte locations. If the Condition Code Set (CC) flag is one, then the condition code is set to zero.

The $M_4$ field specifies the element size control (ES). The ES control specifies the size of the elements in the vector register operands. If a reserved value is specified, a specification exception is recognized.
0—Byte
1—Halfword
2—Word
3-15 Reserved The $M_5$ field has the following format:

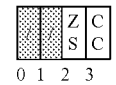

The bits of the $M_5$ field are defined as follows:
Reserved: Bits 0-1 are reserved and must be zero. Otherwise, a specification exception is recognized.
Zero Search (ZS): If one, each element of the second operand is also compared to zero.
Condition Code Set (CC): If zero, the condition code remains unchanged. If one, the condition code is set as specified in the following section.

Special Conditions

A specification exception is recognized and no other action is taken if any of the following occurs:
1. The $M_4$ field contains a value from 3-15.
2. Bits 0-1 of the M5 field are not zero.

Resulting Condition Code:
If bit 3 of the $M_5$ field is set to one, the code is set as follows:

0 If the zero compare bit is set, comparison detected a zero element in the second operand in an element with a smaller index than any equal comparisons.
1 Comparison detected a match between the second and third operands in some element. If the zero compare bit is set, this match occurred in an element with an index less than or equal to the zero comparing element.
2 —
3 No elements compared equal.

If bit 3 of the $M_5$ field is zero, the code remains unchanged.

Program Exceptions:
Data with DXC FE, Vector Register
Operation if the vector-extension facility is not installed
Specification (Reserved ES value)
Transaction Constraint Extended Mnemonics:

| VFEEB | $V_1, V_2, V_3, M_5$ | VFEE | $V_1, V_2, V_3, 0, M_5$ |
| VFEEH | $V_1, V_2, V_3, M_5$ | VFEE | $V_1, V_2, V_3, 1, M_5$ |
| VFEEF | $V_1, V_2, V_3, M_5$ | VFEE | $V_1, V_2, V_3, 0, (M_5|X'1')$ |
| VFEEHS | $V_1, V_2, V_3, M_5$ | VFEE | $V_1, V_2, V_3, 1, (M_5|X'1')$ |
| VFEEFS | $V_1, V_2, V_3, M_5$ | VFEE | $V_1, V_2, V_3, 2, (M_5|X'1')$ |
| VFEEZB | $V_1, V_2, V_3, M_5$ | VFEE | $V_1, V_2, V_3, 0, (M_5|X'2')$ |
| VFEEZH | $V_1, V_2, V_3, M_5$ | VFEE | $V_1, V_2, V_3, 1, (M_5|X'2')$ |
| VFEEZF | $V_1, V_2, V_3, M_5$ | VFEE | $V_1, V_2, V_3, 2, (M_5|X'2')$ |
| VFEEZBS | $V_1, V_2, V_3, M_5$ | VFEE | $V_1, V_2, V_3, 0, (M_5|X'3')$ |
| VFEEZHS | $V_1, V_2, V_3, M_5$ | VFEE | $V_1, V_2, V_3, 1, (M_5|X'3')$ |
| VFEEZFS | $V_1, V_2, V_3, M_5$ | VFEE | $V_1, V_2, V_3, 2, (M_5|X'3')$ |

Programming Notes:
1. A byte index is always stored into the first operand for any element size. For example, if the element size was set to halfword and the 2$^{nd}$ indexed halfword compared equal, then a byte index of 4 would be stored.

2. The third operand should not contain elements with a value of zero. If the third operand does contain a zero and it matches with a zero element in the second operand before any other equal comparisons, condition code one is set regardless of the zero compare bit setting.

Vector Find Element not Equal

```
VFENE   V1,V2,V3,M4,M5                              [VRR-b]
 'E7' | V1 | V2 | V3 |////| M5 |////| M4 | RXB | '81'
  0     8    12   16   20   24   28   32   36    40    47
```

Proceeding from left to right, the unsigned binary integer elements of the second operand are compared with the corresponding unsigned binary integer elements of the third operand. If two elements are not equal, the byte index of the left-most non-equal element is placed in byte seven of the first operand and zeros are stored to all other bytes. If the Condition Code Set (CC) bit in the $M_5$ field is set to one, the condition code is set to indicate which operand was greater. If all elements were equal, then abyte index equal to the vector size is placed in byte seven of the first operand and zeros are placed in all other byte locations. If the CC bit is one, condition code three is set.

If the zero search (ZS) bit is set in the $M_5$ field, each element in the second operand is also compared for equality with zero. If a zero element is found in the second operand before any other element of the second operand are found to be unequal, the byte index of the first byte of the element fount to be zero is stored in byte seven of the first operand. Zeros are stored in all other bytes and condition code 0 is set.

The $M_4$ field specifies the element size control (ES). The ES control specifies the size of the elements in the vector register operands. If a reserved value is specified, a specification exception is recognized.

0—Byte
1—Halfword
2—Word
3-15—Reserved

The $M_5$ field has the following format:

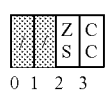

```
////| Z | C
////| S | C
 0   1   2   3
```

The bits of the $M_5$ field are defined as follows:

Zero Search (ZS): If one, each element of the second operand is also compared to zero.

Condition Code Set (CC): If zero, the condition code is not set and remains unchanged.

If one, the condition code is set as specified in the following section.

Special Conditions

A specification exception is recognized and no other action is taken if any of the following occurs:

1. The $M_4$ field contains a value from 3-15.
2. Bits 0-1 of the $M_5$ field are not zero.

Resulting Condition Code:
If bit 3 of the $M_5$ field is set to one, the code is set as follows:

0 If the zero, compare bit is set, comparison detected a zero element in both operands in a lower indexed element than any unequal compares
1 An element mismatch was detected and the element in VR2 is less than the element in VR3
2 An element mismatch was detected and the element in VR2 is greater than the element in VR3
3 All elements compared equal, and if the zero compare bit is set, no zero elements were found in the second operand.

If bit 3 of the $M_5$ field is zero, the code remains unchanged.

Program Exceptions:
 Data with DXC FE, Vector Register
 Operation if the vector-extension facility is not installed
 Specification (Reserved ES value)
 Transaction Constraint Extended Mnemonics:

| VFENEB   | $V_1, V_2, V_3, M_5$ | VFENE | $V_1, V_2, V_3, 0, M_5$ |
| VFENEH   | $V_1, V_2, V_3, M_5$ | VFENE | $V_1, V_2, V_3, 1, M_5$ |
| VFENEF   | $V_1, V_2, V_3, M_5$ | VFENE | $V_1, V_2, V_3, 2, M_5$ |
| VFENEBS  | $V_1, V_2, V_3, M_5$ | VFENE | $V_1, V_2, V_3, 0, (M_5|X'1')$ |
| VFENEHS  | $V_1, V_2, V_3, M_5$ | VFENE | $V_1, V_2, V_3, 1, (M_5|X'1')$ |
| VFENEFS  | $V_1, V_2, V_3, M_5$ | VFENE | $V_1, V_2, V_3, 2, (M_5|X'1')$ |
| VFENEZB  | $V_1, V_2, V_3, M_5$ | VFENE | $V_1, V_2, V_3, 0, (M_5|X'2')$ |
| VFENEZH  | $V_1, V_2, V_3, M_5$ | VFENE | $V_1, V_2, V_3, 1, (M_5|X'2')$ |
| VFENEZF  | $V_1, V_2, V_3, M_5$ | VFENE | V1, V2, V3, 2, $(M_5|X'2')$ |
| VFENEZBS | $V_1, V_2, V_3, M_5$ | VFENE | $V_1, V_2, V_3, 0, (M_5|X'3')$ |
| VFENEZHS | $V_1, V_2, V_3, M_5$ | VFENE | $V_1, V_2, V_3, 1, (M_5|X'3')$ |
| VFENEZFS | $V_1, V_2, V_3, M_5$ | VFENE | $V_1, V_2, V_3, 2, (M_5|X'3')$ |

Vector String Range Compare

```
VSTRC   V1,V2,V3,V4,M5,M6                            [VRR-d]
 'E7' | V1 | V2 | V3 | M5 | M6 |////| V4 | RXB | '8A'
  0     8    12   16   20   24   28   32   36    40    47
```

Proceeding from left to right, the unsigned binary integer elements in the second operand are compared to ranges of values defined by even-odd pairs of elements in the third and fourth operands. The combined with control values from the fourth operand define the range of comparisons to be performed. If an element matches any of the ranges specified by the third and fourth operands, it is considered to be a match.

If the Result Type (RT) flag in the $M_6$ field is zero, the bit positions of the element in the first operand corresponding to the element being compared in the second operand are set to one if the element matches any of the ranges, otherwise they are set to zero.

If the Result Type (RT) flag in the M6 field is set to one, the byte index of the first element in the second operand that matches any of the ranges specified by the third and fourth operands or a zero comparison, if the ZS flag is set to one, is placed in byte seven of the first operand and zeros are stored in the remaining bytes. If no elements match, then an index equal to the number of bytes in a vector is placed in byte seven of the first operand and zeros are stored in the remaining bytes.

The Zero Search (ZS) flag in the $M_6$ field, if set to one, will add a comparison to zero of the second operand elements to the ranges provided by the third and fourth operands. If a zero comparison in a lower indexed element than any other true comparison, then the condition code is set to zero.

The operands contain elements of the size specified by the Element Size control in the $M_5$ field.

The fourth operand elements have the following format:
If ES equals 0:

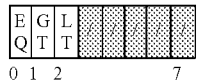

If ES equals 1:

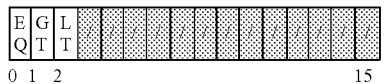

If ES equals 2:

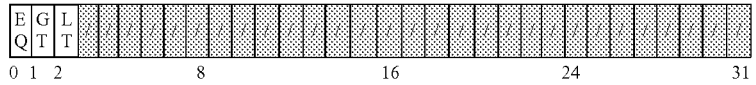

The bits in the fourth operand elements are defined as follows:
Equal (EQ): When one a comparison for equality is made.
Greater Than (GT): When one a greater than comparison is performed.
Less Than (LT): When one a less than comparison is performed.
All other bits are reserved and should be zero to ensure future compatibility.
The control bits may be used in any combination. If none of the bits are set, the comparison will always produce a false result. If all of the bits are set, the comparison will always produce a true result.

The $M_5$ field specifies the element size control (ES). The ES control specifies the size of the elements in the vector register operands. If a reserved value is specified, a specification exception is recognized.
0—Byte
1—Halfword
2—Word
3-15—Reserved
The $M_6$ field has the following format:

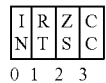

The bits of the $M_6$ field are defined as follows:
Invert Result (IN): If zero, the comparison proceeds with the pair of values in the control vector. If one, the result of the pairs of the comparisons in the ranges are inverted.
Result Type (RT): If zero, each resulting element is a mask of all range comparisons on that element. If one, an index is stored into byte seven of the first operand. Zeroes are stored in the remaining bytes.

Zero Search (ZS): If one, each element of the second operand is also compared to zero.
Condition Code Set (CC): If zero, the condition code is not set and remains unchanged. If one, the condition code is set as specified in the following section.

Special Conditions

A specification exception is recognized and no other action is taken if any of the following occurs:
1. The $M_4$ field contains a value from 3-15.

Resulting Condition Code:

0 If ZS = 1 and a zero is found in a lower indexed element than any compare
1 Comparison found
2 —
3 No comparison found Program Exceptions:
Data with DXC FE, Vector Register
Operation if the vector-extension facility is not installed
Specification (Reserved ES value)
Transaction Constraint Extended Mnemonics:

| | | | | |
|---|---|---|---|---|
| VSTRCB | $V_1, V_2, V_3, V_4, M_6$ | VSTRC | $V_1, V_2, V_3, V_4, 0, M_6$ |
| VSTRCH | $V_1, V_2, V_3, V_4, M_6$ | VSTRC | $V_1, V_2, V_3, V_4, 1, M_6$ |
| VSTRCF | $V_1, V_2, V_3, V_4, M_6$ | VSTRC | $V_1, V_2, V_3, V_4, 2, M_6$ |
| VSTRCBS | $V_1, V_2, V_3, V_4, M_6$ | VSTRC | $V_1, V_2, V_3, V_4, 0, (M_6|X'1')$ |
| VSTRCHS | $V_1, V_2, V_3, V_4, M_6$ | VSTRC | $V_1, V_2, V_3, V_4, 1, (M_6|X'1')$ |
| VSTRCFS | $V_1, V_2, V_3, V_4, M_6$ | VSTRC | $V_1, V_2, V_3, V_4, 2, (M_6|X'1')$ |
| VSTRCZB | $V_1, V_2, V_3, V_4, M_6$ | VSTRC | $V_1, V_2, V_3, V_4, 0, (M_6|X'2')$ |
| VSTRCZH | $V_1, V_2, V_3, V_4, M_6$ | VSTRC | $V_1, V_2, V_3, V_4, 1, (M_6|X'2')$ |
| VSTRCZF | $V_1, V_2, V_3, V_4, M_6$ | VSTRC | $V_1, V_2, V_3, V_4, 2, (M_6|X'2')$ |
| VSTRCZBS | $V_1, V_2, V_3, V_4, M_6$ | VSTRC | $V_1, V_2, V_3, V_4, 0, (M_6|X'3')$ |
| VSTRCZHS | $V_1, V_2, V_3, V_4, M_6$ | VSTRC | $V_1, V_2, V_3, V_4, 1, (M_6|X'3')$ |
| VSTRCZFS | $V_1, V_2, V_3, V_4, M_6$ | VSTRC | $V_1, V_2, V_3, V_4, 2, (M_6|X'3')$ |

| | VR2→ | A | b | C | d | e | F | 1 | 2 |
|---|---|---|---|---|---|---|---|---|---|
| GE | A | T | T | T | T | T | T | F | F |
| LE | Z | T | F | T | F | F | T | F | F |
| GE | a | F | T | F | T | T | F | F | F |
| LE | c | T | T | T | F | F | T | T | T |
| LE | 4 | F | F | F | F | F | F | T | T |
| GE | 0 | T | T | T | T | T | T | T | T |
| EQ | d | F | F | F | T | F | F | F | F |
| EQ | d | F | F | F | T | F | F | F | F |
| VR4↑ | VR3↑ | | | | | | | | |
| IN = 0 | VR1 (a)→ | FFFF | FFFF | FFFF | FFFF | 0000 | FFFF | FFFF | FFFF |
| IN = 1 | VR1 (a)→ | 0000 | 0000 | 0000 | 0000 | FFFF | 0000 | 0000 | 0000 |
| IN = 0 | VR1(b)→ | 0000 | 0000 | 0000 | 0000 | | | | |
| IN = 1 | VR1(b)→ | 0000 | 0000 | 0000 | 0008 | | | | |
| | | | | | index | | | | |

FIG. 23-1.
ES = 1,
ZS = 0
VR1 (a) Results with RT = 0
VR1(b) Results with RT = 1

Load Count to Block Boundary

```
LCBB  R₁,D₂(X₂,B₂),M₃                [RXE]
'E7' | R₁ | X₂ | B₂ |   D₂   | M₃ |     | '27'
0      8    12   16    20     32   36    40  47
```

A 32-bit unsigned binary integer containing the number of bytes possible to load from the second operand location without crossing a specified block boundary, capped at sixteen is placed in the first operand.

The displacement is treated as a 12-bit unsigned integer.
The second operand address is not used to address data.
The $M_3$ field specifies a code that is used to signal the CPU as to the block boundary size to compute the number of possible bytes loaded. If a reserved value is specified then a specification exception is recognized.

Code Boundary
0 64-Byte
1 128-Byte
2 256-Byte
3 512-Byte
4 1K-Byte
5 2K-Byte
6 4K-Byte
7-15 Reserved Resulting Condition Code:

| | |
|---|---|
| 0 | Operand one is sixteen |
| 1 | — |
| 2 | — |
| 3 | Operand one less than sixteen |

Resulting Condition Code:
Program Exceptions:
  Operation if the vector-extension facility is not installed
  Specification Programming Note:
It is expected that LOAD COUNT TO BLOCK BOUNDARY will be used in conjunction with VECTOR LOAD TO BLOCK BOUNDARY to determine the number of bytes that were loaded.

Vector Load GR from VR Element

```
VLGV  R₁,V₃,D₂(B₂),M₄                [VRS-c]
'E7' | R₁ | V₃ | B₂ |   D₂   | M₄ | RXB | '21'
0      8    12   16    20     32   36    40  47
```

The element of the third operand of size specified by the ES value in the M4 field and indexed by the second operand address is placed in the first operand location. The third operand is a vector register. The first operand is a general register. If the index specified by the second operand address is greater than the highest numbered element in the third operand, of the specified element size, the data in the first operand is unpredictable.

If the vector register element is smaller than a doubleword, the element is right aligned in the 64-bit general register and zeros fill the remaining bits.

The second operand address is not used to address data; instead the rightmost 12 bits of the address are used to specify the index of an element within the second operand.

The $M_4$ field specifies the element size control (ES). The ES control specifies the size of the elements in the vector register operands. If a reserved value is specified, a specification exception is recognized.

0—Byte
1—Halfword
2—Word
3—Doubleword
4-15—Reserved unchanged.

Resulting Condition Code:
  The code is unchanged.

Program Exceptions:
  Data with DXC FE, Vector Register
  Operation if the vector-extension facility is not installed
  Specification (Reserved ES value)
  Transaction Constraint
Extended Mnemonics:

| VLGVB | R1, V3, D2(B2) | VLGV | R1, V3, D2(B2), 0 |
|---|---|---|---|
| VLGVH | R1, V3, D2(B2) | VLGV | R1, V3, D2(B2), 1 |
| VLGVF | R1, V3, D2(B2) | VLGV | R1, V3, D2(B2), 2 |
| VLGVG | R1, V3, D2(B2) | VLGV | R1, V3, D2(B2), 3 |

Vector Load to Block Boundary

| VLBB | $V_1,D_2(X_2,B_2),M_3$ | | | | | | [VRX] |
|---|---|---|---|---|---|---|---|
| 'E7' | $R_1$ | $X_2$ | $B_2$ | $D_2$ | $M_3$ | RXB | '07' |
| 0 | 8 | 12 | 16 | 20 | 32 | 36 | 40  47 |

The first operand is loaded starting at the zero indexed byte element with bytes from the second operand. If a boundary condition is encountered, the rest of the first operand is unpredictable. Access exceptions are not recognized on bytes not loaded.

The displacement for VLBB is treated as a 12-bit unsigned integer.

The $M_3$ field specifies a code that is used to signal the CPU as to the block boundary size to load to. If a reserved value is specified, a specification exception is recognized.
Code Boundary
0 64-Byte
1 128-Byte
2 256-Byte
3 512-Byte
4 1K-Byte
5 2K-Byte
6 4K-Byte
7-15 Reserved
Resulting Condition Code:
  The code remains unchanged.
Program Exceptions:
  Access (fetch, operand 2)
  Data with DXC FE, Vector Register
  Operation if the vector-extension facility is not installed
  Specification (Reserved Block Boundary Code)
  Transaction Constraint
Programming Notes:
1. In certain circumstances data may be loaded past the block boundary. However, this will only occur if there are no access exceptions on that data.
Vector Store

| VST | $V_1,D_2(X_2,B_2)$ | | | | | [VRX] |
|---|---|---|---|---|---|---|
| 'E7' | $V_1$ | $X_2$ | $B_2$ | $D_2$ | RXB | '0E' |
| 0 | 8 | 12 | 16 | 20 | 32  36 | 40  47 |

The 128-bit value in the first operand is stored to the storage location specified by the second operand. The displacement for VST is treated as a 12-bit unsigned integer.
Resulting Condition Code:
  The code remains unchanged.

Program Exceptions:
  Access (store, operand 2)
  Data with DXC FE, Vector Register
  Operation if the vector-extension facility is not installed
  Transaction Constraint
Vector Store with Length

| VSTL | $V_1,D_2(B_2),R_3$ | | | | | [VRS-b] |
|---|---|---|---|---|---|---|
| 'E7' | $V_1$ | $R_3$ | $B_2$ | $D_2$ | RXB | '3F' |
| 0 | 8 | 12 | 16 | 20 | 32  36 | 40  47 |

Proceeding from left to right, bytes from the first operand are stored at the second operand location. The general register specified third operand contains a 32-bit unsigned integer containing a value that represents the highest indexed byte to store. If the third operand contains a value greater than or equal to the highest byte index of the vector, all bytes of the first operand are stored.

Access exceptions are only recognized on bytes stored.

The displacement for VECTOR STORE WITH LENGTH is treated as a 12-bit unsigned integer.
Resulting Condition Code:
  The condition code remains unchanged.
Program Exceptions:
  Access (store, operand 2)
  Data with DXC FE, Vector Register
  Operation if the vector-extension facility is not installed
  Transaction Constraint
RXB Description
  All vector instructions have a field in bits 36-40 of the instruction labeled as RXB. This field contains the most significant bits for all of the vector register designated operands. Bits for register designations not specified by the instruction are reserved and should be set to zero; otherwise, the program may not operate compatibly in the future. The most significant bit is concatenated to the left of the four-bit register designation to create the five-bit vector register designation.
  The bits are defined as follows:
  0. Most significant bit for the vector register designation in bits 8-11 of the instruction.
  1. Most significant bit for the vector register designation in bits 12-15 of the instruction.
  2. Most significant bit for the vector register designation in bits 16-19 of the instruction.
  3. Most significant bit for the vector register designation in bits 32-35 of the instruction.
Vector Enablement Control
  The vector registers and instructions may only be used if both the vector enablement control (bit 46) and the AFP-register-control (bit 45) in control register zero are set to one. If the vector facility is installed and a vector instruction is executed without the enablement bits set, a data exception with DXC FE hex is recognized. If the vector facility is not installed, an operation exception is recognized.

What is claimed is:
1. A method of executing a machine instruction in a central processing unit, the method comprising:
  obtaining, by a processor, a machine instruction for execution, the machine instruction being defined for computer execution according to a computer architecture, the machine instruction comprising:

at least one opcode field to provide an opcode, the opcode identifying a Vector Find Element Equal operation;

an extension field to be used in designating one or more registers;

a first register field to designate a first register, the first register comprising a first operand;

a second register field to designate a second register, the second register comprising a second operand;

a third register field to designate a third register, the third register comprising a third operand; and a mask field, the mask field comprising one or more controls to be used during execution of the machine instruction; and executing the machine instruction, the execution comprising:

identifying the first register based on a combination of the first register field and a first portion of the extension field, identifying the second register based on a combination of the second register field and a second portion of the extension field, and identifying the third register based on a combination of the third register field and a third portion of the extension field;

searching the second operand for a zero element, wherein the searching the second operand for a zero element finds a zero element at a first byte position and the searching provides a null index set to a value that is a byte position of a sequentially-first zero element found in the search;

comparing one or more elements of the second operand with one or more elements of the third operand for equality, wherein the comparing finds an equal element at a second byte position and the comparing provides a compare index separate from the null index, the compare index being set to a value that is a byte position of a sequentially-first equal element; and selecting between the null index and the compare index to provide a result of executing the machine instruction, the result being the null index or the compare index and being a value of a byte position of a sequentially-first zero element or equal element or a value indicating a size of the second operand, and the selecting being based on whether an equal element or zero element is found, wherein the selecting selects the lesser of the first byte position and the second byte position.

2. The method of claim 1, wherein the result is a byte index of an element, the element being a zero element or an equal element, and the method further comprises:

adjusting the result, the adjusting comprising performing at least one operation on the result to provide an adjusted result, the adjusted result comprising an index of a first byte of the element; and storing the adjusted result in the first operand.

3. The method of claim 2, wherein the machine instruction further comprises another mask field, the another mask field including an element size control, the element size control specifying a size of elements in at least one of the first operand, the second operand, or the third operand, and wherein the size is used in the adjusting.

4. The method of claim 1, wherein the result is a value indicating a size of the second operand, and the method further comprises storing the result in the first operand.

5. The method of claim 1, wherein the mask field comprises a condition code set control, and wherein the method comprises:

determining whether the condition code set control is set; and based on the condition code set control being set, setting a condition code for execution of the machine instruction.

6. The method of claim 5, wherein the setting the condition code comprises one of:

setting the condition code to a value indicating detection of a zero element in a lower indexed element than any equal compares; and setting the condition code to a value indicating a matched element.

7. The method of claim 1, wherein the executing comprises determining, at runtime, a direction for the comparing, wherein the direction is one of left-to-right or right-to-left, and the determination comprises accessing by the machine instruction a direction control to determine the direction.

8. The method of claim 1, wherein the second operand and the third operand comprise N bytes, and wherein the comparing comprises comparing in parallel the N bytes of the second operand with the N bytes of the third operand, and wherein a size of an element comprises one of one byte, two bytes or four bytes.

9. The method of claim 1, wherein the value of the byte position of the zero element comprises a byte index, the byte index being an index of a first byte of the zero element.

10. The method of claim 1, wherein the value of the byte position of the equal element comprises a byte index, the byte index being an index of a byte of the equal element.

11. A method of executing a machine instruction in a central processing unit, the method comprising:

obtaining, by a processor, a machine instruction for execution, the machine instruction being defined for computer execution according to a computer architecture, the machine instruction comprising:

at least one opcode field to provide an opcode, the opcode identifying a Vector Find Any Equal operation;

an extension field to be used in designating one or more registers;

a first register field to designate a first register, the first register comprising a first operand;

a second register field to designate a second register, the second register comprising a second operand;

a third register field to designate a third register, the third register comprising a third operand; and a mask field, the mask field comprising one or more controls to be used during execution of the machine instruction; and executing the machine instruction, the execution comprising:

identifying the first register based on a combination of the first register field and a first portion of the extension field, identifying the second register based on a combination of the second register field and a second portion of the extension field, and identifying the third register based on a combination of the third register field and a third portion of the extension field;

searching the second operand for a zero element, wherein the searching the second operand for a zero element finds a zero element at a first byte position and the searching provides a null index set to a value that is a byte position of a sequentially-first zero element found in the search;

comparing each element of a first plurality of elements of the second operand with each element of a second plurality of elements of the third operand for equality, wherein the comparing finds an equal element at a second byte position and the comparing provides a result index, separate from the null index, set to a value that is a byte position of a sequentially-first equal element;

determining whether a result type field of the mask field indicates an index result or a mask result;

based on the result type field indicating an index result, selecting between the null index and the result index to provide a result of executing the machine instruction, the result being the null index or the result index and being a value of a byte position of a sequentially-first zero or equal element or a value indicating a size of the second operand, the selecting being based on whether an equal element or zero element is found, wherein the selecting selects the lesser of the first byte position and the second byte position, and storing in the first operand a byte index resulting from the selecting; and based on the result type field indicating a mask result, storing in the first operand a mask corresponding to each element of the second operand, the mask set based on at least one of the comparing and the searching.

12. The method of claim 1, wherein the combination of the first register field and the first portion of the extension field comprises a combination of bits of the first register field and at least one bit of the first portion of the extension field to form an identifier to identify the first register, the at least one bit of the first portion of the extension field being specific to identification of the first register based on combining the at least one bit with the bits of the first register field.

13. The method of claim 11, wherein the combination of the first register field and the first portion of the extension field comprises a combination of bits of the first register field and at least one bit of the first portion of the extension field to form an identifier to identify the first register, the at least one bit of the first portion of the extension field being specific to identification of the first register based on combining the at least one bit with the bits of the first register field.

14. The method of claim 1, wherein the selecting is based on either no equal element being detected in a lower indexed element than a zero element or no zero element being detected in a lower indexed element than an equal element.

15. The method of claim 1, wherein the selecting selects a lowest index of the null index or the compare index.

16. The method of claim 11, wherein the selecting is based on either no equal element being detected in a lower indexed element than a zero element or no zero element being detected in a lower indexed element than an equal element.

17. The method of claim 11, wherein the selecting selects a lowest index of the null index or the result index.

18. The method of claim 1, wherein the comparing finds at least two equal elements at different byte positions, and wherein the compare index is set to the byte position, of the different byte positions, of the sequentially-first equal element of the at least two equal elements.

19. The method of claim 1, wherein the selecting is based on whether a zero element is found with a lower byte position in the second operand than any other element of the second operand found to be equal.

* * * * *